US006861978B2

(12) United States Patent
Lam

(10) Patent No.: US 6,861,978 B2
(45) Date of Patent: Mar. 1, 2005

(54) METHOD AND SYSTEM FOR MUTUAL COHERENT SYNTHETIC APERTURE RADIOMETRY

(75) Inventor: Larry K. Lam, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/367,621

(22) Filed: Feb. 14, 2003

(65) Prior Publication Data

US 2004/0004569 A1 Jan. 8, 2004

Related U.S. Application Data

(60) Provisional application No. 60/371,716, filed on Apr. 12, 2002.

(51) Int. Cl.$^7$ .............................. G01S 3/02; G01S 13/00
(52) U.S. Cl. ......................................... 342/351; 342/25
(58) Field of Search ................................ 342/351, 430, 342/418, 189, 25; 250/250

(56) References Cited

U.S. PATENT DOCUMENTS

| 4,794,395 | A | * | 12/1988 | Cindrich et al. ............ 342/424 |
| 4,990,925 | A | | 2/1991 | Edelsohn et al. |
| 5,016,018 | A | * | 5/1991 | Chang et al. ............... 342/351 |
| 5,142,291 | A | * | 8/1992 | Chang et al. ............... 342/424 |
| 5,659,318 | A | * | 8/1997 | Madsen et al. .............. 342/25 |
| 5,708,442 | A | | 1/1998 | Whelan et al. |
| 6,057,799 | A | | 5/2000 | Martin-Neira et al. |
| 6,452,181 | B1 | * | 9/2002 | Glass et al. ................. 250/342 |

OTHER PUBLICATIONS

Edelsohn, C.R., "Application of Synthetic Aperture Radiometry" IGARSS '94, Aug. 1994, pp. 1326–1328, vol. 3.*
Laursen, B. et al, "Spaceborne Synthetic Aperture Radiometer Simulated by the TUD Demonstration Model," IGARSS '94, Aug. 1994, pp. 1314–1316, vol. 3.*

Le Vine, David et al, "A Multifrequency Microwave Radiometer of the Future," IEEE Trans. on Geoscience and Remote Sensin vol. 27, no 2, 3/1989, pp. 193–199.*
Born, M. et al., *Principles of Optics*, Sixth Edition. Pergamon Press, Chapter 10, pp. 491–555, Oxford, 1980, United Kingdom.
Bracewell, R., *The Fourier Transform and its Applications*, Chapters 3, 5, 12 & 13, pp. 24–50, 69–97, 241–290, McGraw-Hill, 1978, New York.

(List continued on next page.)

*Primary Examiner*—Gregory C. Issing
(74) *Attorney, Agent, or Firm*—McDermott, Will & Emery LLP

(57) ABSTRACT

Method and system for synthetic aperture radiometry not limited by the Van Cittert-Zernike theorem and the quasi-monochromatic assumption. A radiometer system (300) for imaging the emissions from a distribution of incoherent emission sources located within a target area comprising a first antenna (322) configured to receive a first signal (326) emitted primarily from a target area, and a second antenna (324) configured to receive a second signal (327) emitted primarily from the target area. The first and second antennas may be located at approximately the same distance from the target area (310) or at substantially different distances from the target area (310). The radiometer system (300) is configured to allow the second antenna (324) to move faster than the first antenna (322) with respect to the target area (310), with the second antenna (324) moving along a predetermined trajectory corresponding to a synthetic aperture (430). A cross correlation receiver (330) computes a plurality of cross correlation functions as based on all relevant relative time delays between the first signal (326) and the second signal (327). The image processor (340) converts computed correlation data (332) into a plurality of complex valued radial down range profiles of the target area and further computes an image of the target area based on synthetic aperture image processing principle.

32 Claims, 18 Drawing Sheets

OTHER PUBLICATIONS

Burke et al., *An Introduction to Radio Astronomy*, Chapters 3, 5 & 6, pp. 24–35 and 50–84, Cambridge University, 1997, New York.

Carrara et al., *Spotlight Synthetic Aperture Radar Signal Processing Algorithm*, Chapters 1–3 & 10, pp. 1–154 and 401–439, 1995, Artech House, MA.

Gardner, William A., *Statistical Spectral Analysis A Non ProbabilisticTheory*, Chapters 2 & 7, pp. 34–66, 211–243, 1988, Simon & Shuster, New Jersey.

Piepmeier et al., *Synthetic Thinned Aperture Radiometry (STAR) Technologies Enabling 10–km Soil Moisture Remote Sensing from Space*, NASA's Goddard Space Flight Center, Greenbelt, MD 20771.

D. Levine et al., *ESTAR Measurements During the Southern Great Plains Experiment (SGP99)*, IEEE Transactions on Geoscience and Remote Sensing, vol. 39, No. 8, Aug. 2001.

Ryle et al., *The Synthesis of Large Radio Telescopes by the Use of Radio Interferometers*, IRE Trans. Antenna Propag., No. 7, S120–124, 1959.

* cited by examiner

METHOD AND SYSTEM FOR MUTUAL COHERENT SYNTHETIC APERTURE RADIOMETRY

CROSS-REFERENCES TO RELATED APPLICATIONS

This application claims priority to U.S. Provisional No. 60/371,716 filed Apr. 12, 2002, which is incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention relates in general to imaging objects and/or areas. More particularly, the invention provides a method and system for imaging based on mutual coherent radiometry. Merely by way of example, the invention is described as it applies to satellite and airborne surveillance, but it should be recognized that the invention has a broader range of applicability.

Correlation radiometry is related to interferometric radiometry. Interferometric radiometry is a terminology that is familiar to the community of radio astronomy and optical sciences. One of the earliest known experiments of interferometry is the Young's double slit experiment, which demonstrated the interference pattern produced by monochromatic light. Such double slit experiment as well as others that followed largely established the construct of using an interference fringe pattern as a measure for characterizing the mutual coherence between two signals, including thermal emission signals. When the thermal emission signals to be characterized are polychromatic, interference fringe patterns do not form clearly, therefore other methods or apparatus may be more suitable for characterize the mutual coherence of polychromatic signals.

Thermal emission signals are emissions originated from sources of incoherent electromagnetic radiation. The statistical properties of thermal emission may be utilized to form an image of a scene of interest. A statistical measure that underlies the principle of interferometric image formation is the mutual coherence function. Conventional aperture synthesis imaging systems usually rely on the Van Cittert-Zernike theorem, which is based on the quasi-monochromatic assumption. The quasi-monochromatic assumption usually requires the conventional aperture synthesis imaging systems to use narrow band signals. The Van Cittert-Zernike theorem is a quasi-monochromatic formulation of the mutual coherence function, and the formulation leads to methods and systems for image formation that usually require the imaging systems to collect $\Gamma(U,V)$ data to fill a $(U,V)$ plane. The data in the $(U,V)$ plane are usually defined assuming narrow band signals. For example, the principle of aperture synthesis imaging has been applied to observing celestial stars and other objects. Conventional aperture synthesis imaging systems general operate in accordance with the Van Cittert-Zernike theorem and the quasi-monochromatic assumption.

The method of conventional aperture synthesis generally requires that a significant portion of the $(U,V)$ plane be covered with $\Gamma(U,V)$ data, or interferometric data. For example, to obtain acceptable image quality, a conventional aperture synthesis imaging system generally has to collect a sufficient amount of lower spatial frequency $\Gamma(U,V)$ data, which corresponds to the central area of the $(U,V)$ plane, as well as a sufficient amount of higher spatial frequency $\Gamma(U,V)$ data, which corresponds to the non-central areas of the $(U,V)$ plane. Since a diversity of interferometer baselines are required to provide the needed coverage in the $(U,V)$ plane, the method of conventional aperture synthesis generally uses more than a single pair of receivers. For example, a conventional systems may use multiple receivers moving in controlled formations and covering pre-determined patterns to collect all the required $\Gamma(U,V)$ data. When a single pair of receivers is used to provide a diversity of interferometer baselines, such a system generally is designed with the means to deliver a sufficient variation in the lengths and orientations associated with the data collecting interferometer baselines. The cost of a conventional aperture synthesis system depends on the amount of $\Gamma(U,V)$ data that the system is designed to collect.

Prior art relating to correlation radiometry includes at least the Synthetic Thinned Aperture Radiometry (STAR), the Electronically Scanned Thinned Array Radiometer (ESTAR), and the Radiometric SAR (RADSAR). Prior art also includes systems that generally assume relatively short interferometer baselines, e.g., five wavelengths. Prior art usually relies on the Van Cittert-Zernike theorem and are limited by quasi-monochromatic assumption.

Hence it is highly desirable to improve imaging techniques.

BRIEF SUMMARY OF THE INVENTION

The present invention relates in general to imaging objects and/or areas. More particularly, the invention provides a method and system for imaging based on mutual coherent radiometry. Merely by way of example, the invention is described as it applies to satellite and airborne surveillance, but it should be recognized that the invention has a broader range of applicability.

According to the present invention, a number of embodiments of the Mutual Coherent Synthetic Aperture Radiometry, McSAR, are provided. Merely by way of an example, a radiometer system for imaging the emissions from a distribution of incoherent emission sources located within a target area includes a first antenna configured to receive a first signal emitted primarily from a target area and a second antenna configured to receive a second signal emitted primarily from the target area. Additionally the system includes a cross correlation receiver configured to compute a cross correlation function between the first signal and the second signal as a function of all relevant relative time delays between the first signal and the second signal, and an image processor configured to compute an image of the target area based on a plurality of computed complex valued radial down range profiles of the target area.

In another embodiment of the present invention, a system for imaging may include a first antenna, a second antenna, and a processing system. The first antenna is configured to receive from an imaging target a first signal occupying a first bandwidth comprising substantially more than one frequency. The second antenna is configured to receive from the imaging target a second signal occupying a second bandwidth comprising substantially more than one frequency. The processing system is configured to process the first signal and the second signal and to output an image of the imaging target.

In yet another embodiment, a system for imaging includes a first antenna, a second antenna, and a processing system. The first antenna is configured to receive from an imaging target a first signal occupying a first bandwidth comprising substantially more than one frequency. The second antenna is located from the imaging target substantially the same distance as the first antenna and is configured to receive from the imaging target a second signal occupying a second bandwidth comprising substantially more than one frequency. The processing system is configured to process the first signal and the second signal and to output an image of the imaging target.

In yet another embodiment, a system for imaging includes a first antenna, a second antenna, and a processing system. The first antenna is configured to receive from an imaging target a first signal occupying a first bandwidth comprising substantially more than one frequency. The second antenna is located from the imaging target a distance shorter than the first antenna from the imaging target and is configured to receive from the imaging target a second signal occupying a second bandwidth comprising substantially more than one frequency. The processing system is configured to process the first signal and the second signal and to output an image of the imaging target.

Many benefits may be achieved by way of the present invention over conventional techniques. For example, the present invention does not have to rely on the Van Cittert-Zernike theorem and the quasi-monochromatic assumption. The present invention can use wide bandwidth signals for imaging a target area and achieve high imaging resolution. In addition, the present invention may use as few as two antennas and thereby simplify the configuration of the imaging system and reduce the cost of the imaging system.

Depending upon the embodiment under consideration, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to imaging objects and/or areas. More particularly, the invention provides a method and system for imaging based on mutual coherent radiometry. Merely by way of example, the invention is described as it applies to satellite and airborne surveillance, but it should be recognized that the invention has a broader range of applicability.

Mutual coherent refers to the correlation property between two signals, which is characterized by computing the correlation between the signals as a function of all relevant relative time delays between them. This method of characterization is applicable whether the two signals under consideration are polychromatic or quasi-monochromatic. In other words, this method of characterization is applicable to wide band signals as well as narrow band signals. However, further formulations and details associated with the method may differ depending on the assumptions made.

Interferometric radiometry is a terminology commonly used by the radio astronomy community in describing the method and system of Aperture Synthesis Mapping. These methods and systems generally assume narrow band signals, operate in accordance with the Van Cittert-Zernike theorem, and operate in accordance with a quasi-monochromatic formulation of the mutual coherent function. These systems generally are designed to produce interference fringe patterns and/or measure interferometric fringe data. Hence, the terminology "interferometric radiometry" is used hereafter in reference to methods and systems of imaging concerning quasi-monochromatic thermal emission sources. Furthermore, interferometric radiometry is used hereafter in reference to methods or apparatus that are associated with the production, measurement, and/or collection of interference fringe patterns. Furthermore, the terminology of interferometric radiometry is used hereafter in reference to methods and apparatus associated with the objective of characterizing the coherent property of two quasi-monochromatic or narrow band signals.

For clarity and differentiation purpose, the terminology "mutual coherent radiometry" is used hereafter in reference to methods and systems concerning the characterization of polychromatic thermal emission sources. The terminology "correlation radiometry" is used hereafter in reference to a general class of methods and systems that use suitable means to correlate two signals as the basis for radiometric measurements.

Mutual Coherence Function

Figure 1:
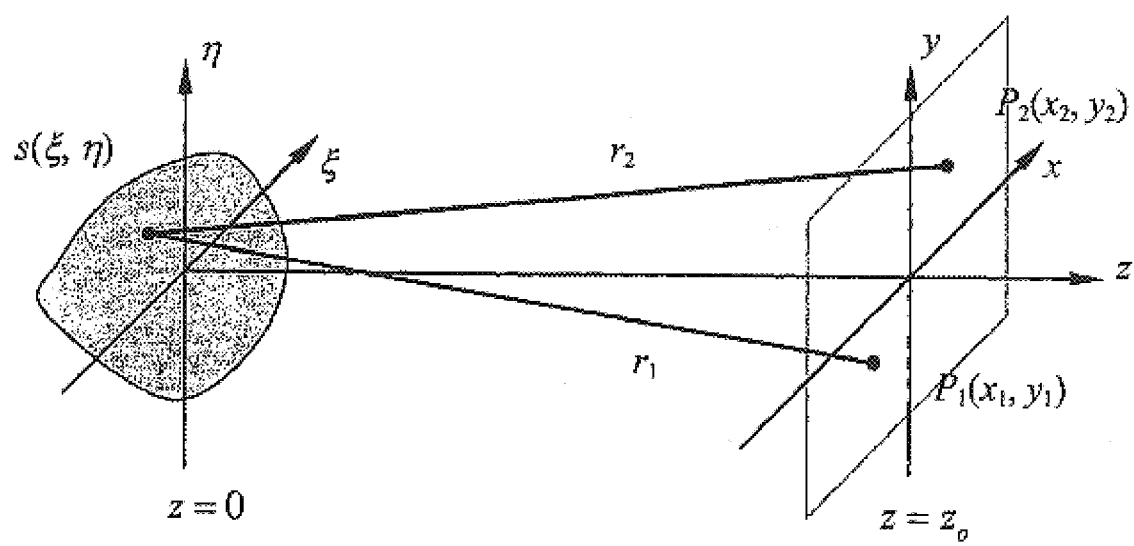
FIG. 1 illustrates a simplified geometry for Van Cittert-Zernike Theorem.

Conventional aperture synthesis imaging systems are based on collecting data on the mutual coherence function. As shown in FIG. 1, mutual coherence is a temporal average of the cross correlation between the signals that can be collected at two different points $P_1$ and $P_2$ in space. The signals collected are $u(P_1,t)$ and $u(P_2,t)$, which are represented by complex random variables. There are two types of coherences, temporal coherence and spatial coherence. Temporal coherence depends on only temporal variable, while spatial coherence depends on only spatial variable. Combining temporal coherence and spatial coherence, a mutual coherence function, denoted by $\Gamma(P_1,P_2,\tau)$, is a function of both spatial and temporal variables. More specifically, temporal coherence is a function of the form $\Gamma(P_1,P_1,\tau) = <u(P_1,t+\tau)u^*(P_1,t)>$, spatial coherence is a function of the form $\Gamma(P_1,P_2,\tau=0) = <u(P_1,t)u^*(P_2,t)>$, and mutual coherence is a function of the form $\Gamma(P_1,P_2,\tau) = <u(P_1,t+\tau)u^*(P_2,t)>$.

The mutual coherence function has been shown to be approximated by $$\Gamma(P_1,P_2,\tau) = <u(P_1,t+\tau)u^*(P_2,t)> \approx \Gamma(\Delta x, \Delta y, \tau) \quad \text{(Equation 1)}$$

where $\Delta x$ and $\Delta y$ respectively denote the separations between points $P_1$ and $P_2$ along the x and y dimensions of a Cartesian coordinate. This function may be normalized to define another function called the complex degree of coherence, $$\gamma(\Delta x, \Delta y, \tau) = \frac{\Gamma(\Delta x, \Delta y, \tau)}{\Gamma(\Delta x = 0, \Delta y = 0, \tau = 0)} \quad \text{(Equation 2)}$$

$$= \frac{\Gamma(\Delta x, \Delta y, \tau)}{\Gamma_0}$$

where $\Gamma_0$ is a measure of the correlative power that could be collected at a single observation point. By definition, $\Gamma_0$ represents the highest level of correlative signal power that could be collected.

For temporal coherence, $u(P,t)$ represents the signal associated with a wave field at a point P in space, and at an instant t in time. Associated with $u(P,t)$ is a complex envelope $a(P,t)$. The signal $u(P,t)$ is assumed to have a finite bandwidth $\Delta f$, thus the amplitude and phase of $a(P,t)$ are expected to be changing substantially for an interval of time approximately equal to or longer than $1/\Delta f$. In other words, within an interval of $\tau << 1/\Delta f$, $a(P,t)$ and $a(P,t+\tau)$ are highly correlated. It may be said that $a(P,t)$ is highly coherent within an interval much less than the coherence time, $\tau_c \equiv 1/\Delta f$. Thus $$u(P,t) = b(P,t) \exp\{j2\pi f_o t\} \quad \text{(Equation 3)}$$

where $f_o$ denotes a center frequency. The temporal coherence function is $$\Gamma(P,P,\tau) = <u(P,t+\tau)u^*(P,t)> = <a(P,t+\tau)a^*(P,t)> \exp\{+j2\pi f_o \tau\}, \quad \text{(Equation 4)}$$

where $<a(P,t+\tau)a^*(P,t)>$ represents an envelope function of the temporal coherence function. Thus $$<a(P,t+\tau)a^*(P,t)> \approx 1 \text{ for } \tau << \tau_c \quad \text{(Equation 5)}$$

The corollary is that $$<a(P,t+\tau)a^*(P,t)> \approx 0 \text{ for } \tau >> 1/\Delta f. \quad \text{(Equation 6)}$$

For a stationary stochastic process, the relationship between the auto-correlation function and the power spectral density of the signal b(t) is $$\gamma(\tau) = \frac{\int b(t+\tau) b^*(t) dt}{\int b(t) b^*(t) dt} = \int_{-\infty}^{\infty} |B(f)|^2 \exp\{j2\pi f \tau\} df \quad \text{(Equation 7)}$$

where $\gamma(\tau)$ denotes the auto-correlation function, and $|B(f)|^2$ denotes the normalized power spectral density of the signal b(t).

Similar to temporal coherence, for spatial coherence, $u(P_1,t)$ and $u(P_2,t)$ represent the signals of a wave field at the points $P_1$ and $P_2$ in space, and at the instant t in time. These signals are assumed to take the following form:

$$u(P_1,t) = a(P_1,t) \exp\{j2\pi f_o t\} \text{ and } u(P_2,t) = a(P_2,t) \exp\{j2\pi f_o t\} \quad \text{(Equation 8)}$$

where $f_o$ denotes a center frequency. Therefore the spatial coherence function is $$\Gamma(P_1,P_2,\tau=0) = <u(P_1,t)u^*(P_2,t)> = <a(P_1,t)a^*(P_2,t)>. \quad \text{(Equation 9)}$$

When $P_1$ and $P_2$ are close together, the signals are expected to be highly correlated. When the two points are far apart, the correlation between the signals is expected to be low. Accordingly, a spatial coherence length may be defined to characterize the spatial coherence function. A definition for the spatial coherence length, L, is that it is equal to the separation between $P_1$ and $P_2$ such that the spatial coherence function is equal to ½ of the auto-correlation function of the signal at $P_1$. By this definition, $$\langle a(P_1, t+\tau) a^*(P_L, t) \rangle = \frac{1}{2} \langle a(P_1, t+\tau) a^*(P_1, t) \rangle \quad \text{(Equation 10)}$$

where $|P_1 - P_L| = L$. Hence $$<a(P_1,t+\tau)a^*(P_2,t)> \approx 1 \text{ for } |P_1 - P_2| << L \quad \text{(Equation 11)}$$

where L denotes a coherence length. The corollary is that $$<a(P_1,t+\tau)a^*(P_2,t)> \approx 0 \text{ for } |P_1 - P_2| >> L \quad \text{(Equation 12)}$$

The wave field immediately in front of an extended thermal emission source is expected to be highly incoherent, or the spatial coherence length of near field can be relatively short. On the other hand, the wave field far from the extended thermal emission source is expected to be much more coherent. In other words, the spatial coherence length of the far field can be relatively large. This dependence of spatial coherence length on distance from plane of observation to plane of thermal source is used to derive the Van Cittert-Zernike theorem and thereby simplify the mutual coherence function.

Van Cittert-Zernike Theorem Based on Quasi-Monochromatic Assumption

FIG. 1 illustrates the geometry for the Van Cittert-Zernike Theorem. In FIG. 1, an extended thermal emission source, denoted by $s(\xi,\eta)$, is defined on a plane specified in the $(\xi,\eta)$ coordinate. Observations are made on the plane specified in the (x,y) coordinate. The z-axis is common to both planar coordinate systems. These planes are parallel to each other and separated by a distance $z_o$.

The wave field observed at points $P_1$ and $P_2$ are denoted by $u(P_1,t)$ and $u(P_2,t)$. Hence the mutual coherence function is $$\Gamma(P_1,P_2,t) = \langle u(P_1,t+\tau)u^*(P_2,t)\rangle \qquad \text{(Equation 13)}$$

where
$$u(P_1, t+\tau) = \int \frac{s(\xi, \eta, t - r_1/c + \tau)}{r_1} d\xi d\eta,$$

$$u(P_2, t) = \int \frac{s(\xi, \eta, t - r_2/c)}{r_2} d\xi d\eta,$$

$s(\xi,\eta)$ is the signal from an elemental thermal emission source located at $(\xi,\eta)$, c is the speed of light, and $r_1$ and $r_2$ respectively are the distances from the elemental source to the observation points $P_1$ and $P_2$. The mutual coherence function is $$\langle u(P_1, t+\tau)u^*(P_2, t)\rangle = \qquad \text{(Equation 14)}$$

$$\left\langle \int \frac{s(\xi_m, \eta_m, t - r_1/c + \tau)}{r_1} d\xi_m d\eta_m \times \int \frac{s^*(\xi_n, \eta_n, t - r_2/c)}{r_2} d\xi_n d\eta_n \right\rangle,$$

where the subscripts m and n denote elemental sources at locations $(\xi_m,\eta_m)$ and $(\xi_n,\eta_n)$. The signals $s(\xi_m,\eta_m,t)$ and $s(\xi_n,\eta_n,t)$ are statistically independent from each other, and each has a zero mean. In other words $$\langle s(\xi_m,\eta_m,t)s^*(\xi_n,\eta_n,t)\rangle = \langle s(\xi_m,\eta_m,t)\rangle\langle s^*(\xi_n,\eta_n,t)\rangle = 0, \text{ for } m\neq n. \qquad \text{(Equation 15)}$$

where the coherence length of a wave field is approximately very small. More precisely, it has been suggested that the coherence length L of a wave field at a plane that is close to an extended thermal source is on the order of the average wavelength of the thermal emission. In other words, $$\langle s(\xi_m,\eta_m,t)s^*(\xi_n,\eta_n,t)\rangle = \langle s(\xi_m,\eta_m,t)\rangle\langle s^*(\xi_n,\eta_n,t)\rangle \approx 0 \qquad \text{(Equation 16)}$$

for $\sqrt{(\xi_m-\xi_n)^2+(\eta_m-\eta_n)^2} >> \bar{\lambda}$ where $\bar{\lambda}$ denotes the average wavelength of the thermal emission.

Both Equations 15 and 16 point to an important construct, which is that the mutual coherence function is the sum of the mutual coherence functions of the individual elemental thermal emission sources. This construct is illustrated by the transformation from the expression in Equation 14 to the following expression $$\text{(Equation 17)}$$
$$\langle u(P_1, t+\tau)u^*(P_2, t)\rangle = \left\langle \int \frac{s(\xi, \eta, t - r_1/c + \tau)s^*(\xi, \eta, t - r_2/c)}{r_1 r_2} d\xi d\eta \right\rangle$$
$$= \int \frac{\langle s(\xi, \eta, t - (r_1 - r_2)/c + \tau)s^*(\xi, \eta, t)\rangle}{r_1 r_2} d\xi d\eta,$$

where $(r_1-r_2)/c+\tau$ is a time-delay function of several variables, $(\xi,\eta,P_1,P_2,\tau)$. In Equation 17, the variable $r_2$ has been shifted from one part of the integrand to another. This operation is allowed if we assume that the signals are represented by an ergodic stationary stochastic process. In other words, the statistical property of the extended thermal emission source remains constant for the entire duration of observation and is independent of the order of integration.

Further, the distances $r_1$ and $r_2$ are given by $$r_1 = \sqrt{z_o^2 + (x_1 - \xi)^2 + (y_1 - \eta)^2}, \qquad \text{(Equation 18)}$$

and $$r_2 = \sqrt{z_o^2 + (x_2 - \xi)^2 + (y_2 - \eta)^2}. \qquad \text{(Equation 19)}$$

To derive a far field approximation of Equation 17, where $z_o >> \{\xi_{max}, \eta_{max}, x_{max}, y_{max}\}$, the time-delay function is approximated based on a binomial expansion; hence $$\frac{r_1 - r_2}{c} + \tau \approx \frac{(x_1 - \xi)^2 + (y_1 - \eta)^2}{2z_o c} - \qquad \text{(Equation 20)}$$
$$\frac{(x_2 - \xi)^2 + (y_2 - \eta)^2}{2z_o c} + \tau$$
$$\approx \frac{1}{2z_o c}\{P_1^2 - P_2^2 + 2\Delta x\xi + 2\Delta y\eta\} + \tau,$$

where $P_1^2 = (x_1^2 + y_1^2)$, $P_2^2 = (x_2^2 + y_2^2)$, $\Delta x = x_2 - x_1$ and $\Delta y = y_2 - y_1$. In the far field, the mutual coherence function is a function of $$\left(\frac{\Delta x \xi}{cz_o}, \frac{\Delta y \eta}{cz_o}, \tau\right) \qquad \text{(Equation 21)}$$

Thus mutual coherence may be approximated by a function of the length and orientation of the baseline formed by the receivers. The absolute locations of the receivers do not enter into the formulation.

The signal from an elemental thermal emission source is denoted by $b(\xi,\eta,t)\exp\{j2\pi f_o t\}$, where $b(\xi,\eta,t)$ denotes a complex scalar with a bandwidth of $\Delta f$, and $f_o$ denotes the center frequency of the signal. Hence, $$s(\xi, \eta, t - (r_1 - r_2)/c + \tau) = b(\xi, \eta, t - (r_1 - r_2)/c + \tau)\exp \qquad \text{(Equation 22)}$$
$$\left\{j2\pi f_o\left(t - \frac{1}{2z_o c}\{P_1^2 - P_2^2 + 2\Delta x\xi + 2\Delta y\eta\} + \tau\right)\right\},$$

And $$s^*(\xi,\eta,t) = b^*(\xi,\eta,t)\exp\{-j2\pi f_o t\}. \qquad \text{(Equation 23)}$$

An elemental mutual coherence function of the signals is defined to be the mutual coherence function due to an elemental source, as expressed by $$s(\xi, \eta, t - (r_1 - r_2)/c + \tau)s^*(\xi, \eta, t)d\xi d\eta = \qquad \text{(Equation 24)}$$
$$b(\xi, \eta, t - (r_1 - r_2)/c + \tau)b^*(\xi, \eta, t)\exp$$
$$\left\{-\frac{jk}{2z_o}\{P_1^2 - P_2^2 + 2\Delta x\xi + 2\Delta y\eta\} + j2\pi f_o\tau\right\}d\xi d\eta$$

where $k = 2\pi f_o/c$, denotes a wave-number. The mutual coherence function for the extended thermal emission source is $$\langle u(P_1, t+\tau)u^*(P_2, t)\rangle = \exp\left\{\frac{jk}{2z_o}\{P_2^2 - P_1^2\} + j2\pi f_o\tau\right\} \times \quad \text{(Equation 25)}$$

$$\int \frac{\langle b(\xi, \eta, t-(r_1-r_2)/c+\tau)b^*(\xi, \eta, t)\rangle}{r_1 r_2}$$

$$\exp\left\{-\frac{jk}{2z_o}\{2\Delta x\xi + 2\Delta y\eta\}\right\}d\xi d\eta$$

It should be noted that the time delay $\tau$ is a parameter imposed during signal processing, which occurs after signal reception. Therefore the exponential factor may be deleted, because $\exp\{j2\pi f_o\tau\}=1$ for $f_o=0$, which is accomplished by converting the received signals $u(P_1,t)$ and $u(P_2,t)$ to baseband. In addition, the factor $1/r_1r_2$ may be approximated by $1/z_o^2$. Thus $$\langle u(P_1, t+\tau)u^*(P_2, t)\rangle = \exp\left\{\frac{jk}{2z_o}\{P_2^2 - P_1^2\}\right\} \times \quad \text{(Equation 26)}$$

$$\frac{1}{z_o^2} \times \int \langle b(\xi, \eta, t-(r_1-r_2)/c+\tau)b^*(\xi, \eta, t)\rangle$$

$$\exp\left\{-\frac{jk}{2z_o}\{2\Delta x\xi + 2\Delta y\eta\}\right\}d\xi d\eta$$

If the time-delay function $(r_1-r_2)/c+\tau$ is small compared to the coherence time $\tau_c$, it may be neglected and Equation 26 may be approximated by $$\langle u(P_1, t+\tau)u^*(P_2, t)\rangle = \exp\left\{\frac{jk}{2z_o}\{P_2^2 - P_1^2\}\right\} \times \frac{1}{z_o^2} \times \quad \text{(Equation 27)}$$

$$\int \langle b(\xi, \eta, t)b^*(\xi, \eta, t)\rangle\exp\left\{-\frac{jk}{2z_o}\{2\Delta x\xi + 2\Delta y\eta\}\right\}d\xi d\eta.$$

Rewriting the above equation gives (Equation 28)

$$\Gamma(P_1, P_2, \tau) = \frac{\exp\{j\varphi\}}{z_o^2}\int I(\xi, \eta)\exp\left\{-\frac{jk}{2z_o}\{2\Delta x\xi + 2\Delta y\eta\}\right\}d\xi d\eta,$$

where $\varphi = \frac{k}{2z_o}\{P_2^2 - P_1^2\}$ and $I(\xi, \eta) = \langle b(\xi, \eta, t)b^*(\xi, \eta, t)\rangle$. $I(\xi, \eta)$ source brightness function.

The above development shows that the mutual coherence function may be approximated by the product of a quadratic phase factor and the Fourier transform of the source brightness function.

$$\Gamma(U, V) = \frac{\exp\{j\varphi\}}{z_o^2}\int I(\xi, \eta)\exp\{-j(U\xi + V\eta)\}d\xi d\eta, \quad \text{(Equation 29)}$$

where $U = \frac{k\Delta x}{z_o}$ (Equation 30)

and $V = \frac{k\Delta y}{z_o}$ (Equation 31)

The parameters (U,V) are the spatial frequencies of the brightness function of the source and have the dimension of cycle per meter. Equations 29–31 represent the Van Cittert-Zernike theorem and serve as the theoretical basis for conventional aperture synthesis. With an appropriate apparatus designed to collect data to fill the (U,V) plane, the brightness function could be obtained by applying a two dimensional inverse Fourier transform to the $\Gamma(U,V)$ data.

Limitations of Conventional Aperture Synthesis Imaging Systems Due to Quasi-Monochromatic Assumption Conventional aperture synthesis imaging systems that operate in accordance to the Van Cittert-Zernike theorem are based on a quasi-monochromatic assumption, which leads to the assumption that $|(r_1-r_2)/c-\tau|\approx 0$ or $|(r_1-r_2)/c-\tau|<<\tau_c$. This assumption is not valid when the extended thermal emission sources are polychromatic.

Figure 2:
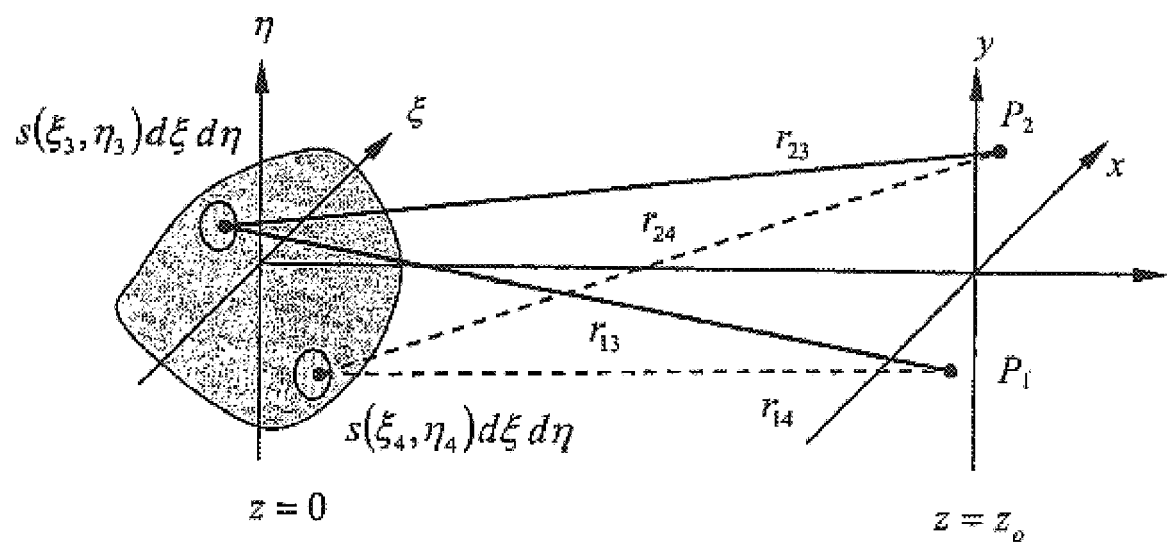
FIG. 2 illustrates a simplified geometry for two pairs of paths to show limitations of Van Cittert-Zernike Theorem.

FIG. 2 illustrates the geometry for a further elaboration of this issue. $r_{mn}$ denotes a path from the observation point $P_m$ to the elemental source $s(\xi_n,\eta_n)d\xi d\eta$. There are two pairs of such paths: a first pair of paths $r_{14}$ and $r_{24}$, and a second pair of paths $r_{13}$ and $r_{23}$. Respectively, they denote the paths from the observation points $P_1$ and $P_2$ to the elemental sources $s(\xi_3,\eta_3)d\xi d\eta$ and $s(\xi_4,\eta_4)d\xi d\eta$. By definition, <$s(\xi_3,\eta_3,t-(r_{13}-r_{23})/c+\tau_3)s^*(\xi_3,\eta_3,t)$> is maximum when $(r_{13}-r_{23})/c-\tau_3=0$, and <$s(\xi_4,\eta_4,t-(r_{14}-r_{24})/c+\tau_4)s^*(\xi_4,\eta_4,t)$> is maximum when $(r_{14}-r_{24})/c-\tau_4=0$.

If $|\tau_3-\tau_4|>>\tau_c$, it follows that $\tau_3\neq\tau_4$, and

<$s(\xi_3,\eta_3,t-(r_{13}-r_{23})/c+\tau_4)s^*(\xi_3,\eta_3,t)$>≈0, and <$s(\xi_4,\eta_4,t-(r_{14}-r_{24})/c+\tau_3)s^*(\xi_4,\eta_4,t)$>≈0.  (Equation 32)

In other words, if the time delay $\tau_n$ that maximizes the elemental mutual coherence function associated with the $n^{th}$ elemental source is a function of $(\xi_n,\eta_n)$, the location of the elemental source, then a new polychromatic formulation of the mutual coherence function for imaging is required. Consequently, when the quasi-monochromatic assumption does not hold, then conventional aperture synthesis imaging systems cannot be reliably upon to provide proper imaging operations.

Hence it is highly desirable to invent system and method for aperture synthesis imaging that does not rely on the Van Cittert-Zernike theorem and is not limited by the quasi-monochromatic assumption.

System and Method of McSAR

Figure 3:
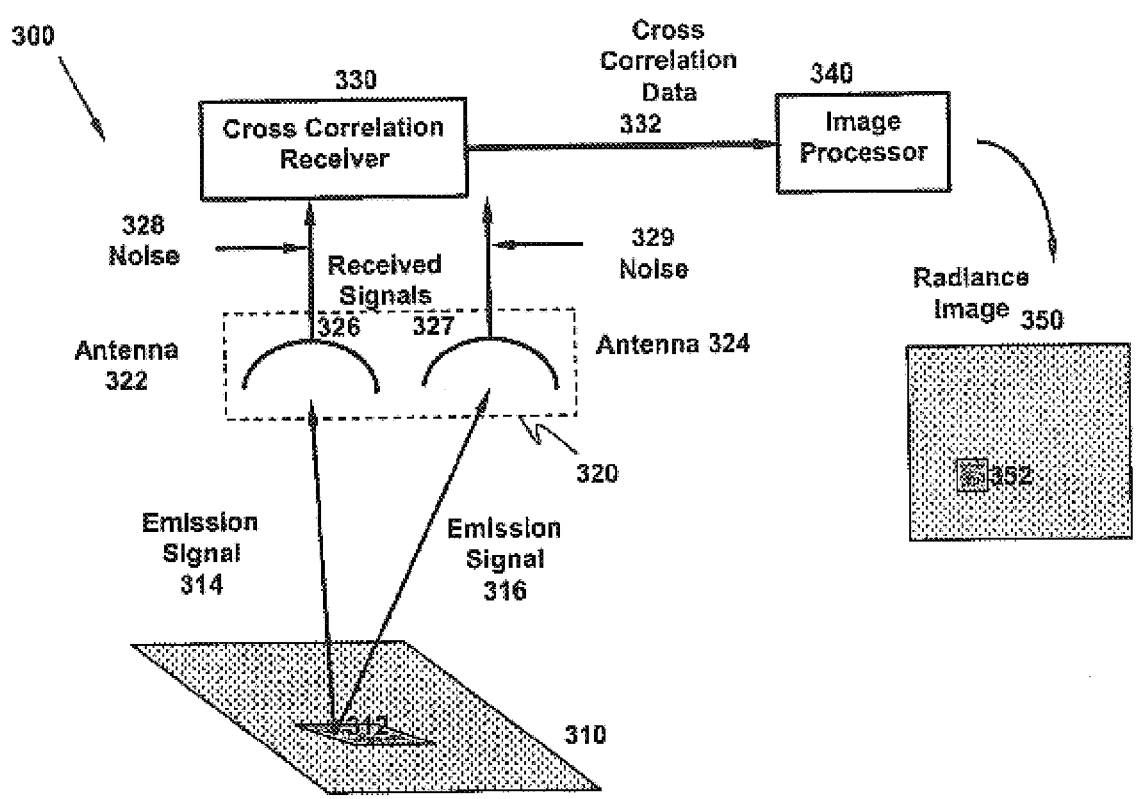
FIG. 3 is a simplified block diagram of a system for mutual coherent synthetic aperture radiometry according to one embodiment of the present invention.

FIG. 3 is a block diagram of a system for mutual coherent synthetic aperture radiometry according to one embodiment of the present invention. System 300 includes three subsystems: antenna system 320, correlation receiver system 330, image processing system 340. Antenna system 320 comprises multiple antennas, such as antenna 322 and antenna 324. Target area 310 emits a plurality of signals. Target area 310 contains a collection of spatially contiguous emission sources and/or a collection of randomly distributed discrete emission sources. An example of the emission signals is indicated by 314 and 316. Target area 310 may contain a variety of thermal emission sources, such as soil or ice. The signal, denoted by 314 and 316, is emitted from a small area 312 and collected by antennas 322 and 324. Antennas 322 and 324 receive a plurality of emission signals from the target area 310 and generate the received signals 326 and 327. Antenna noises 328 and 329 are added to the received signals 326 and 327. The received signals 326 and 327 with added noises 328 and 329 are transmitted to correlation receiver 330. Correlation receiver 330 calculates the mutual coherence function associated with the signals at its inputs. Cross correlation data 332 is then transmitted to image processor 340. Image processor uses cross correlation data 332 to estimate a radiance image 350 that is a representation of the spatial distribution of the thermal emission sources located in the target area 310. Radiance image 350 is a map of the thermal properties of target area 310. These properties include emissivity and temperature. The radiance associated with smaller area 312 that is within larger target area 310 may be estimated based on radiance image 350.

Figure 4:
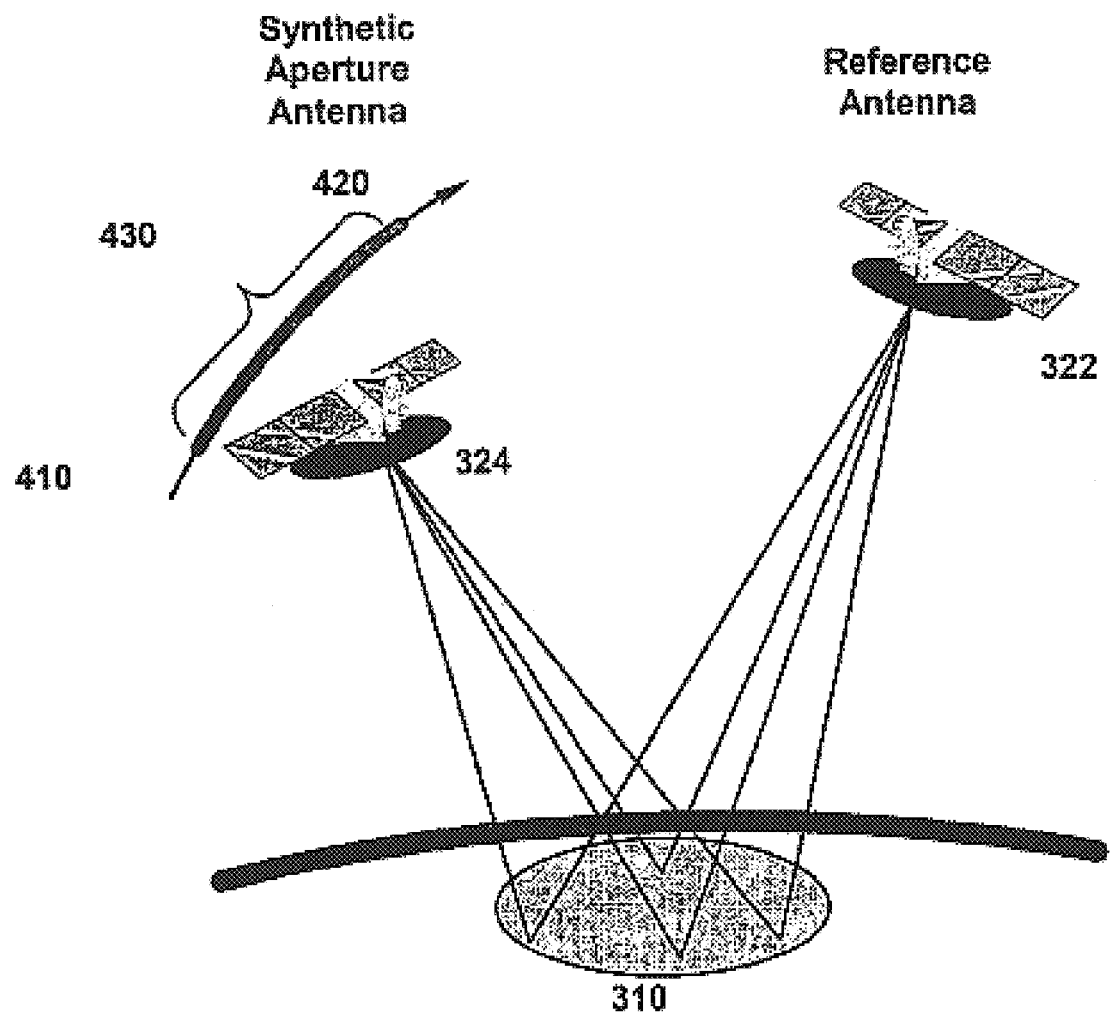
FIG. 4 illustrates a simplified antenna system according to an embodiment of the present invention.

FIG. 4 illustrates antenna system 320 according to an embodiment of the present invention. Antenna system 320 comprises multiple antennas, such as antenna 322 and 324. Antenna 324 is designated to be a synthetic aperture antenna. Antenna 324 is so designated because it moves faster than antenna 322 relative to target area 310. Antenna 322 is designated to be a reference antenna. Antenna 322 is so designated because it moves slower than antenna 324 relative to target area 310. During a data collection interval synthetic aperture antenna 324 moves with respect to reference antenna 322 from position 410 to position 420. The trajectory of synthetic antenna 324 from position 410 to position 420 defines a synthetic aperture 430. The signals received by synthetic aperture antenna 324 as it moves along synthetic aperture 430 are correlated with the signals received by reference antenna 322. The data from the result of correlation processing may be further processed in accordance with the principle of synthetic aperture imaging processing.

Figure 5:
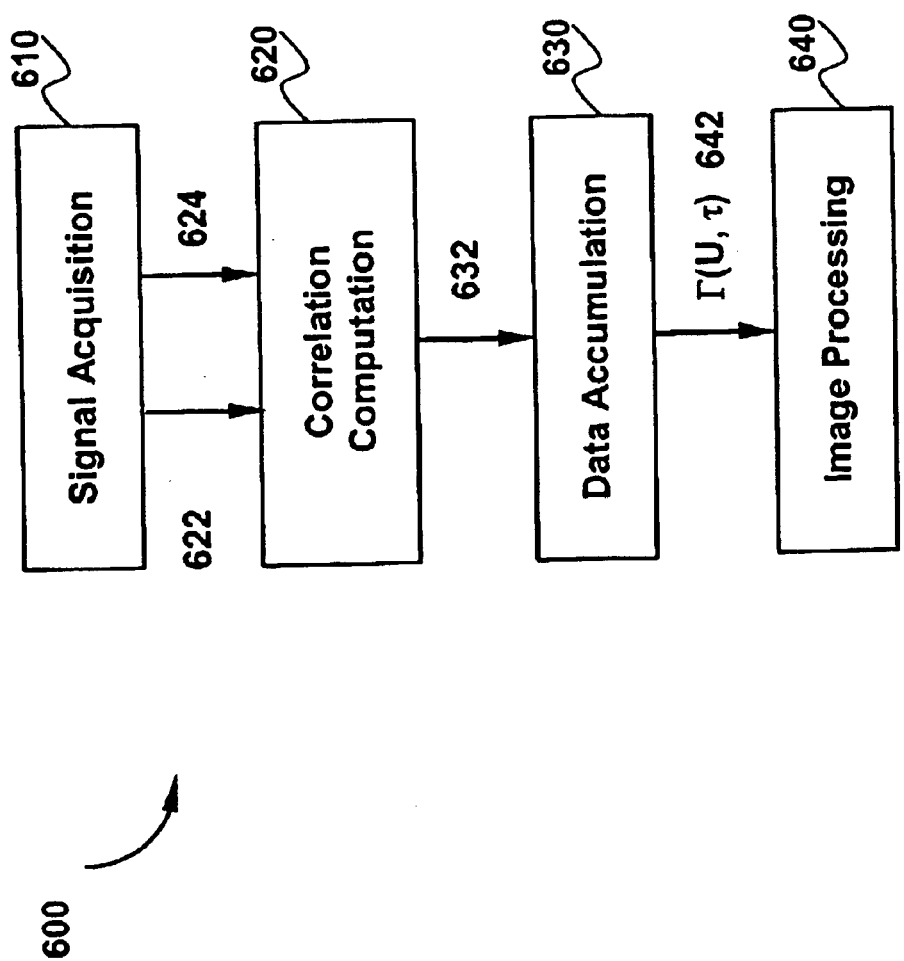
FIG. 5 is a simplified block diagram of a method for mutual coherent synthetic aperture radiometry according to an embodiment of the present invention.

FIG. 5 is a block diagram of a method for mutual coherent synthetic aperture radiometry according to an embodiment of the present invention. Method 600 includes four processes: signal acquisition process 610, correlation computation process 620, data accumulation process 630 and image processing process 640. At signal acquisition process 610, signals emitted from target area 310 are received by multiple antennas. One of the multiple antennas moves slower than all other antennas with respect to the target area and is designated as a reference antenna 322. At least one antenna that moves faster than the reference antenna 322 with respect to the target area 310 is designated as synthetic aperture antenna 324. The inputs to correlation computation step 620 includes two channels of received signals, respectively they are the signals received by reference antenna 322 and the signal received by synthetic aperture antenna 324. At correlation computation step 620, the cross correlation between the two input channels of received signals, 622 and 624, are computed for all relevant relative delays between the received signals. The result of this computation is a cross correlation function and this result is converted into complex valued radial down range profile 632.

Complex valued radial down range profile 632 is computed for a pre-determined duration of received signals. During a pre-determined duration, synthetic aperture antenna 324 moves along a pre-determined short segment along a trajectory. A plurality of complex valued radial down range profiles 632 are computed corresponding to synthetic aperture antenna 324 moving along a plurality of short segments along the trajectory. A plurality of complex valued radial down range profiles 632 are accumulated at data accumulation step 630.

At image processing step 630, a set of complex valued radial down range profiles, denoted by $\Gamma(U,\tau)$ 642, that has been accumulated is used to calculate radiance image 350. Radiance image 350 is an image of the spatial distribution of thermal emission properties of the target area. These thermal properties include emissivity and temperature.

Operations of McSAR

The operation of a system and method in accordance with one embodiment of the present invention is described. Such a system performs mutual coherent synthetic aperture radiometry (McSAR) and is a system comprised of the system to receive signals from a target area, the system to compute the mutual coherent function and complex valued radial down range profiles, and the system to transform a set of complex valued radial down range profiles into a radiance image of the target area. A set of complex valued radial down range profiles is denoted symbolically by $\Gamma(\Delta x, \Delta y, \tau)$ or $\Gamma(U,\tau)$. In contrast, a system and method in accordance with the design of a conventional aperture synthesis mapping system, which is based on the Van Cittert-Zernike theorem, is designed to collect interferometric data, which is a two dimensional spatial frequency data. This type of data is commonly denoted symbolically by $\Gamma(U,V)$. The two types of data are not equivalent. For clarity purpose, the description in the following utilizes the above terminology to differentiate the operation of the present invention from the operations of conventional systems.

The thermal emission from a polychromatic incoherent source is modeled by a signal generated by a stationary stochastic process, and the signal has a finite bandwidth. The mutual coherence function, $\Gamma(\Delta x, \Delta y, \tau)$, is a function of the variable time delay $\tau$ and an approximation to a radial down-range profile of the source brightness function.

More specifically, the mutual coherence function is expressed as an integral of elemental mutual coherence functions $<b(\xi,\eta,t-(r_1-r_2)/c+\tau)b^*(\xi,\eta,t)>d\xi d\eta$ as shown in Equation 25. The elemental mutual coherence function is approximated by $$<b(\xi,\eta,t+\tau)b^*(\xi,\eta,t)> \approx |b(\xi,\eta)|^2 \gamma(\tau) d\xi d\eta \quad \text{(Equation 33)}$$

where $|b(\xi,\eta)|^2 = <b(\xi,\eta,t)b^*(\xi,\eta,t)>$ denotes a source brightness function, and $\gamma(\tau)$ the temporal correlation function that describes the elemental source. The base-band version of Equation 25 is $$\Gamma(\Delta x, \Delta y, \tau) = \quad \text{(Equation 34)}$$
$$\exp\left\{\frac{jk}{2z_o}\{P_2^2 - P_1^2\}\right\} \times \frac{1}{z_o^2} \times \int |b(\xi,\eta)|^2 \gamma(\tau - (r_1 - r_2)/c)$$
$$\exp\left\{-\frac{jk}{2z_o}\{2\Delta x\xi + 2\Delta y\eta\}\right\} d\xi d\eta,$$

Hence the mutual coherence function is approximated by $$\Gamma(\Delta x, \Delta y, \tau) = \exp\left\{\frac{jk}{2z_o}\{P_2^2 - P_1^2\}\right\} \times \quad \text{(Equation 35)}$$
$$\frac{1}{z_o^2} \times \int |b(\xi,\eta)|^2 \exp\left\{-\frac{jk}{2z_o}(\Delta x\xi + \Delta y\eta)\right\}$$
$$\gamma\left(\tau - \frac{P_1^2 - P_2^2}{2z_o c} - \frac{\Delta x\xi + \Delta y\eta}{z_o c}\right) d\xi d\eta$$

The function $\gamma(\tau)$ is assumed to be an impulse-like function. Therefore, for each specific value of time delay, the value of the integral is approximately equal to a line integral of the brightness function multiplied by a two-dimensional Fourier transform kernel. The equation that specifies the line of integration is $$\tau = \frac{P_1^2 - P_2^2}{2z_o c} + \frac{\Delta x\xi + \Delta y\eta}{z_o c} = \text{constant.} \quad \text{(Equation 36)}$$

Figure 6:
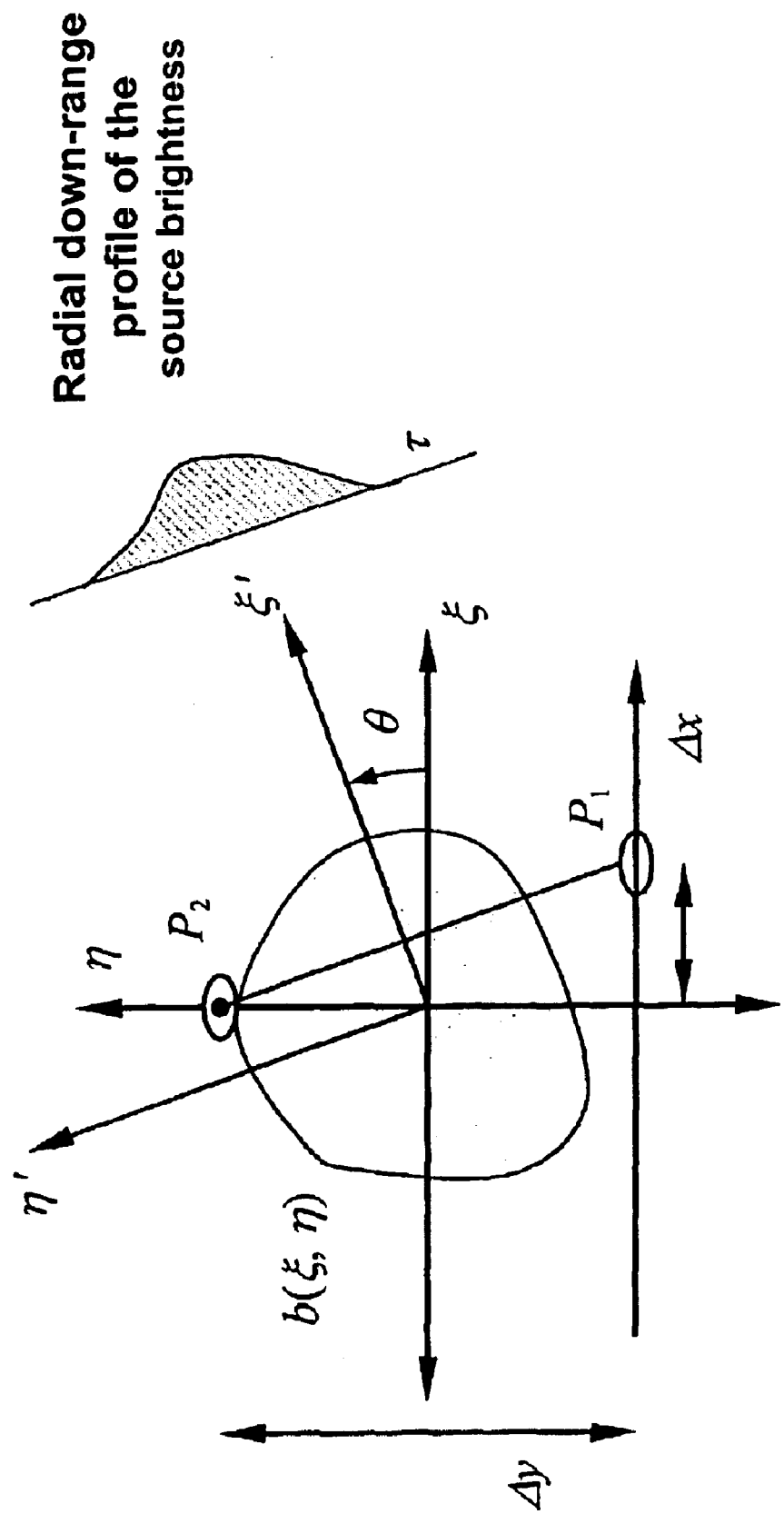
FIG. 6 illustrates a simplified geometry relevant to operations of McSAR according to an embodiment of the present invention.

FIG. 6 illustrates the source brightness function, the $(\xi,\eta)$ coordinate system, and a rotated coordinate system $(\xi',\eta')$, which is oriented at an angle θ relative to (ξ,η). The radial down-range dimension is η', and the cross range dimension is ξ'. The magnitude of a complex valued radial down-range profile of the source brightness function is illustrated on the upper right. With the following transformation equations $$\xi = \cos\theta\xi' - \sin\theta\eta', \text{ and } \eta = \sin\theta\eta' + \cos\theta\eta' \quad \text{(Equation 37)}$$

$$\Gamma(\Delta x, \Delta y, \tau) = \exp\left\{\frac{jk}{2z_o}\{P_2^2 - P_1^2\}\right\} \times \frac{1}{z_o^2} \times \quad \text{(Equation 38)}$$

$$\int |b(\xi',\eta')|^2 \exp\left\{-\frac{jk}{2z_o}((\Delta x\cos\theta + \Delta y\sin\theta)\xi' + (\Delta y\cos\theta - \Delta x\sin\theta)\eta')\right\} \gamma(\tau - p(\eta'))d\xi'd\eta'$$

where γ(τ−p(η')) is the equivalent impulse-like function defined in the rotated coordinate system (ξ',η'). The rotated coordinate system has been defined to ensure p(η') is approximated by a function of the radial down-range dimension η' alone. Therefore $$\Gamma(\Delta x, \Delta y, \tau) = \exp\left\{\frac{jk}{2z_o}\{P_2^2 - P_1^2\}\right\} \times \quad \text{(Equation 39)}$$

$$\frac{1}{z_o^2} \times \exp\left\{-\frac{jk}{z_o}((\Delta y\cos\theta - \Delta x\sin\theta)p^{-1}(\tau))\right\} \times$$

$$\int |b(\xi', p^{-1}(\tau))|^2 \exp\left\{-\frac{jk}{z_o}(\Delta x\cos\theta + \Delta y\sin\theta)\xi'\right\} d\xi',$$

where $\eta'=p^{-1}(\tau)$, and $p^{-1}(\cdot)$ symbolize the inverse function of $p(\cdot)$. Thus $$\Gamma(U,\tau) \propto \int |b(\xi', p^{-1}(\tau))|^2 \exp\{-jU\xi'\}d\xi', \quad \text{(Equation 40)}$$

where $$U = \frac{k}{z_o}(\Delta x\cos\theta + \Delta y\sin\theta) = \frac{k}{z_o}2\Delta x\cos\theta \quad \text{(Equation 41)}$$

Again U is a cross range spatial frequency. Comparing Equations 30 and 41 shows that the definitions of the cross range spatial frequency are similar, except for a factor of 2. The difference is caused by the assumption that γ(τ) is an impulse-like function. A coordinate transformation applied to Equations 30 and 31 affects both components of spatial frequency, (U,V). The same transformation applied to Equation 38 collapses both components onto a line integral.

The mutual coherence function Γ(Δx,Δy,τ) along the τ dimension is shown to be a complex valued radial down-range profile of the source brightness. The radial down-range axis is determined by the projection of the baseline of the receivers from $P_1$ to $P_2$ onto the plane where the source brightness function is defined. It may be desirable to vary Δy in some cases, but for clarity of discussion, Δy is assumed to be constant for the time being. In practice, Δy as well as the orientation of the receiver baseline are expected to vary by small amounts. Multiple time-delay profiles are required to assemble a set of Γ(U,τ) data, and they are mapped to multiple radial down-range profiles of the brightness function. A set of Γ(U,τ) data is used to construct an image of the source brightness function.

Γ(U,τ) data is different from Γ(U,V) data. Γ(U,V) is a set of complex values that characterize the two dimensional spatial frequencies that characterize the angular spectrum of the source brightness function. A two dimensional spatial frequency component is specified in units of cycles per meter and is determined by the length, the orientation and the frequency of operation of the interferometer used for making the measurement. The interferometer that make Γ(U,V) measurements is generally comprised of a pair of narrow band receivers. In contrast, Γ(U,τ) describes a set of complex valued radial down range profiles of the source brightness function. The two types of data Γ(U,τ) and Γ(U,V) are related as follows. If γ(τ)≈1, then Equation 35 reduces to Equation 29. If the thermal emission signals are quasi-monochromatic, then the conventional aperture synthesis method is usually applicable. When the thermal emission signals are polychromatic, then the opposite is usually true.

Figure 7:
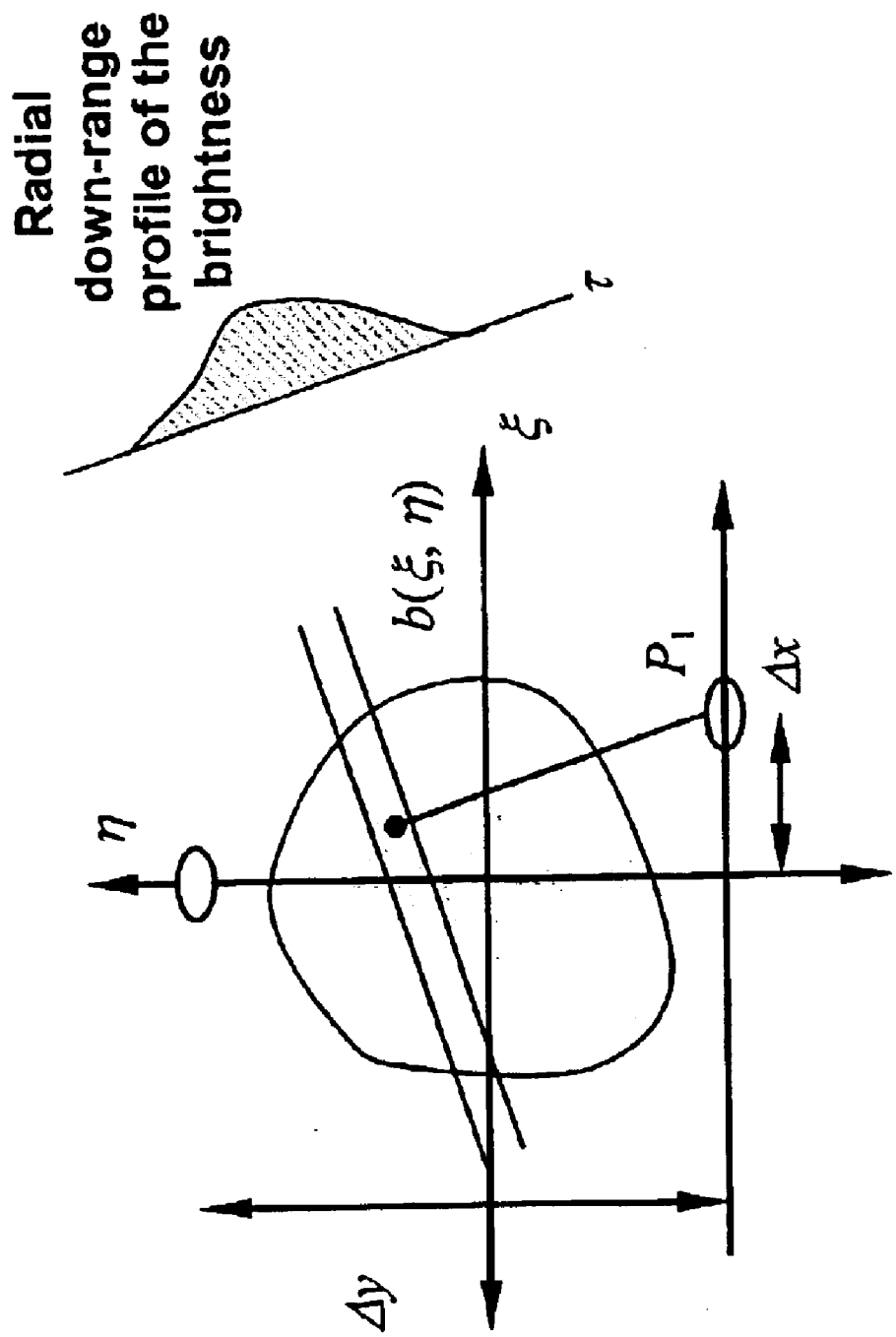
FIG. 7 illustrates a simplified radial down-range profile of source brightness function according to an embodiment of the present invention.

FIG. 7 illustrates the magnitude of a complex valued radial down-range profile of the source brightness function. The specifics of the necessary image re-construction process depend on the specific designs of a McSAR system. For example, complex valued time-delay profiles are first mapped to complex valued radial down range profiles based on the scaling equation as described by Equation 37. Second, complex valued radial down range profiles are appropriately shifted in range to ensure the center of all the complex valued down range profiles is aligned with the center of the source brightness function. The phases of the radial down-range profiles are compensated due to the exponential terms that are external to the integral in Equation 40. Third, the phase of the entire set of complex valued down range profiles are equalized or compensated to ensure coherence across all down range profiles. This is accomplished by transforming the individual complex valued radial down range profiles into complex valued radial spatial frequency angular spectrum based on the projection-slice theorem. The resultant set of complex valued radial spatial frequency angular spectrum is mapped into a two-dimensional spatial frequency domain and on a regularly spaced grid. A two-dimensional Fourier transform is applied to construct an radiance image of the source brightness function. For another example, some image re-construction algorithms developed for spotlight synthetic aperture radars may be applicable to McSAR image reconstruction.

Figure 8:
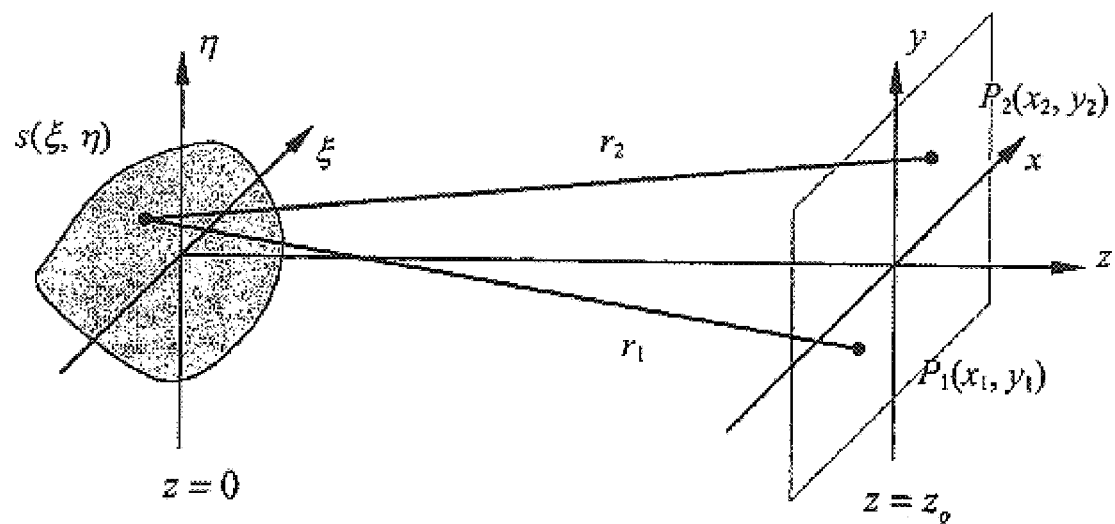
FIG. 8 illustrates a simplified extended polychromatic incoherent thermal emission source with a moderate bandwidth.

FIG. 8 illustrates an extended polychromatic incoherent thermal emission source with a moderate bandwidth. From Equation 35, the mutual coherence function is $$\Gamma(\Delta x, \Delta y, \tau) = \exp\left\{\frac{jk}{2z_o}\{P_2^2 - P_1^2\}\right\} \times \quad \text{(Equation 42)}$$

$$\frac{1}{z_o^2}\int |b(\xi,\eta)|^2 \gamma\left(\tau - \frac{P_1^2 - P_2^2}{2z_o c} - \frac{\Delta x\xi + \Delta y\eta}{z_o c}\right) \exp\left\{-\frac{jk}{z_o}(\Delta x\xi + \Delta y\eta)\right\} d\xi d\eta$$

where $|b(\xi,\eta)|^2 => b(\xi,\eta,t)b^*(\xi,\eta,t)>$ denotes the source brightness density function, and γ(τ) denotes a normalized temporal coherence function associated with a "nominal" element of the extended thermal emission source. Although a nominal element is assumed, the temporal coherence of a wave field near an extended thermal emission source need not be spatially uniform, nor is it necessary that the temporal coherence of a specific elemental source conform to a nominal. Equation 42 is a statistical characterization of the brightness function over the duration of observation.

A nominal temporal coherence function can be defined based on statistical measurements using receivers with finite bandwidths. The response of the receiver is the factor that primarily determines the nominal temporal coherence function γ(τ).

Figure 9:
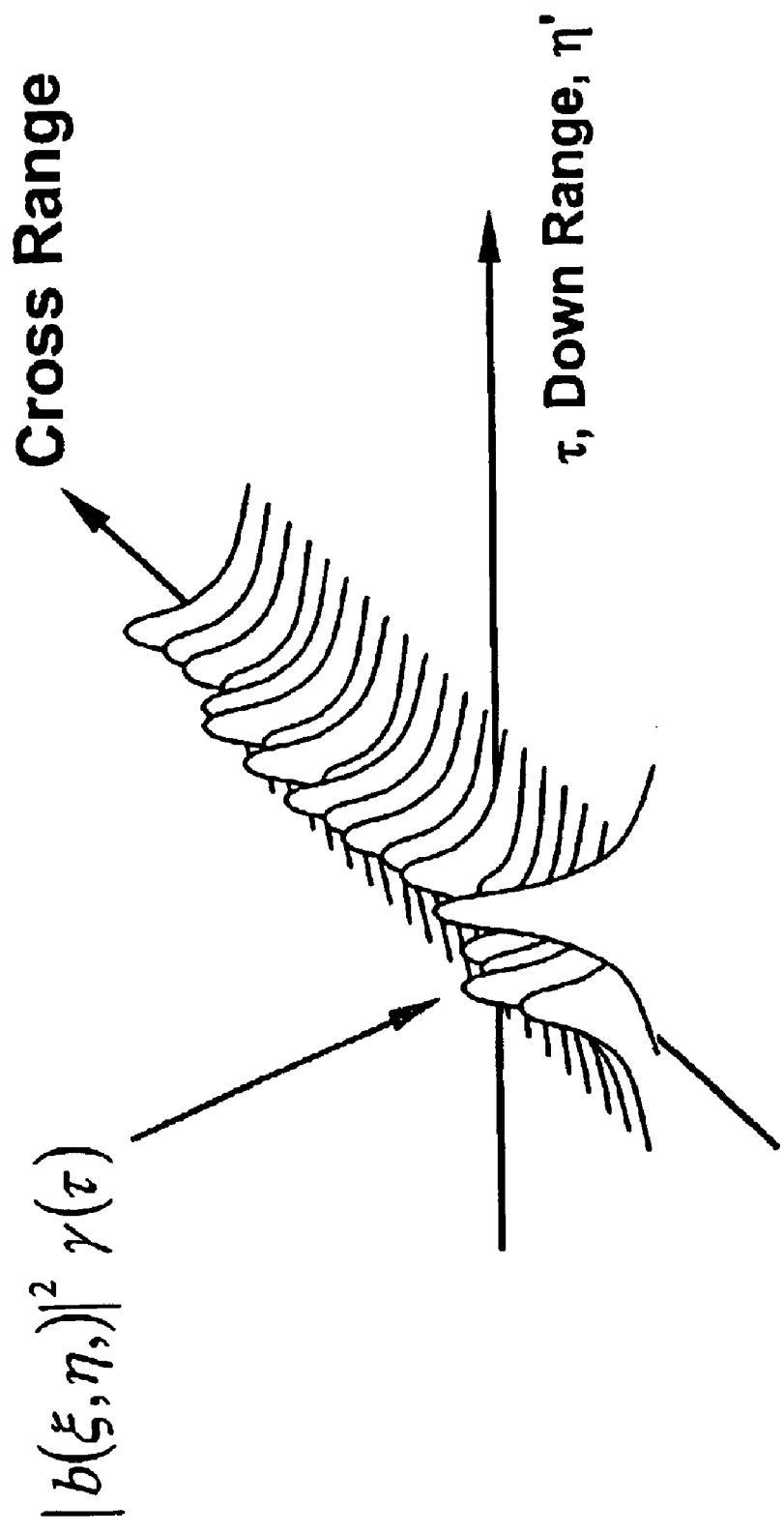
FIG. 9 illustrates a simplified array of elemental mutual coherence functions under certain conditions.

FIG. 9 illustrates an array of elemental mutual coherence functions $|b(\xi,\eta)|^2 \Gamma(\tau)$ that correspond to $\tau=0$, at $$\frac{P_1^2 - P_2^2}{2z_o c} + \frac{\Delta x \xi + \Delta y \eta}{z_o c} = 0. \qquad \text{(Equation 42a)}$$

By definition $\gamma(\tau=0)=1$. This assumes all elemental mutual coherence functions have the same nominal shape and a full-width-half-maximum ("FWHM") of $\tau_c$, where $\tau_c = 1/\Delta f$ is defined to be the coherence time of the received thermal emission signals, and $\Delta f$ denotes the bandwidth of the receiver. Since it is an auto-correlation function of the signal $b(\xi,\eta)$, $\gamma(\tau)$ is a Hermitian function. In other words, the real part of $\gamma(\tau)$ has en even symmetry and the imaginary part odd symmetry about $\tau=0$.

In addition, idealized elemental sources are assuming to have an isotropic radiation pattern; thus $$<b(\xi,\eta t-(r_1-r_2)/c+\tau)b^*(\xi,\eta t)> = |b(\xi,\eta)|^2 \gamma(\tau). \qquad \text{(Equation 43)}$$

If a resolution cell associated with McSAR is much larger in size than the size associated with an independent elemental mutual coherence function, then the Central-Limit Theorem suggests that a nominal function may be defined. Since the nominal function is defined by the sum of a large number of elemental mutual coherence functions, it is assumed to have a Gaussian shape.

Exemplary Embodiments of McSAR

Figure 10A:
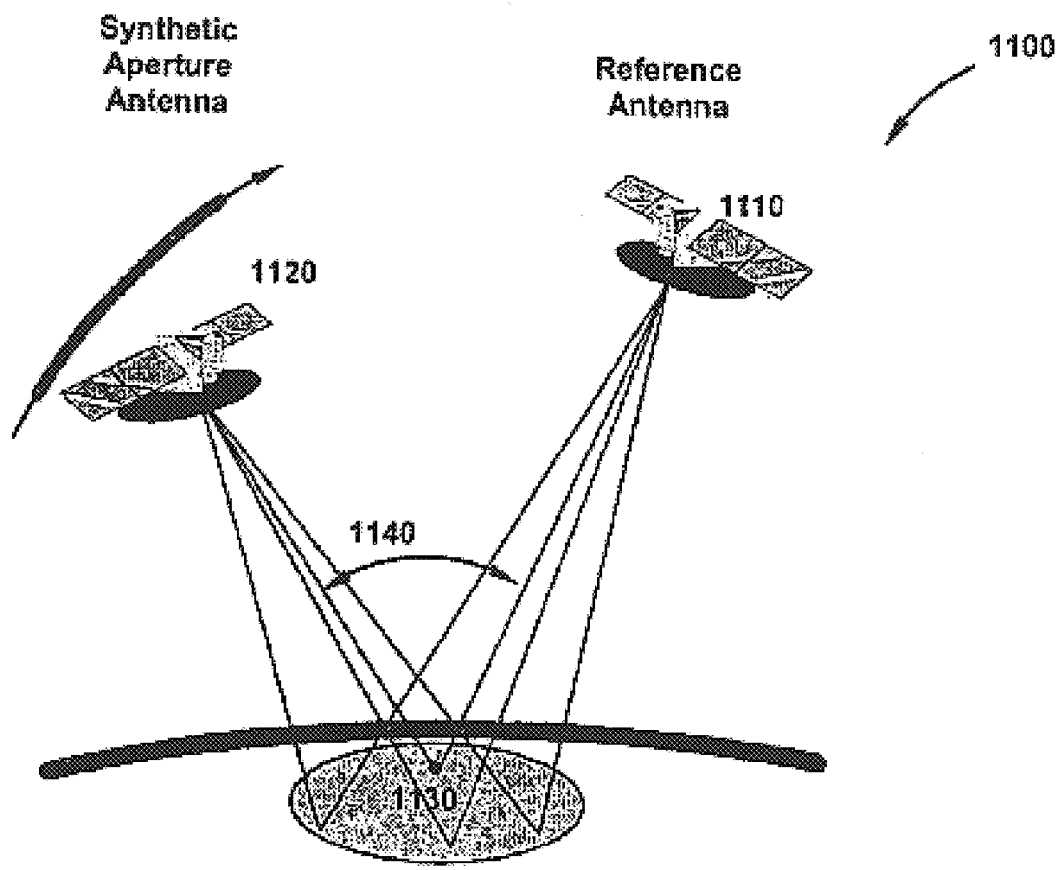
FIGS. 10(a) and (b) are simplified block diagrams of antenna systems for mutual coherent synthetic aperture radiometry according to an embodiment of the present invention.
Figure 10B:
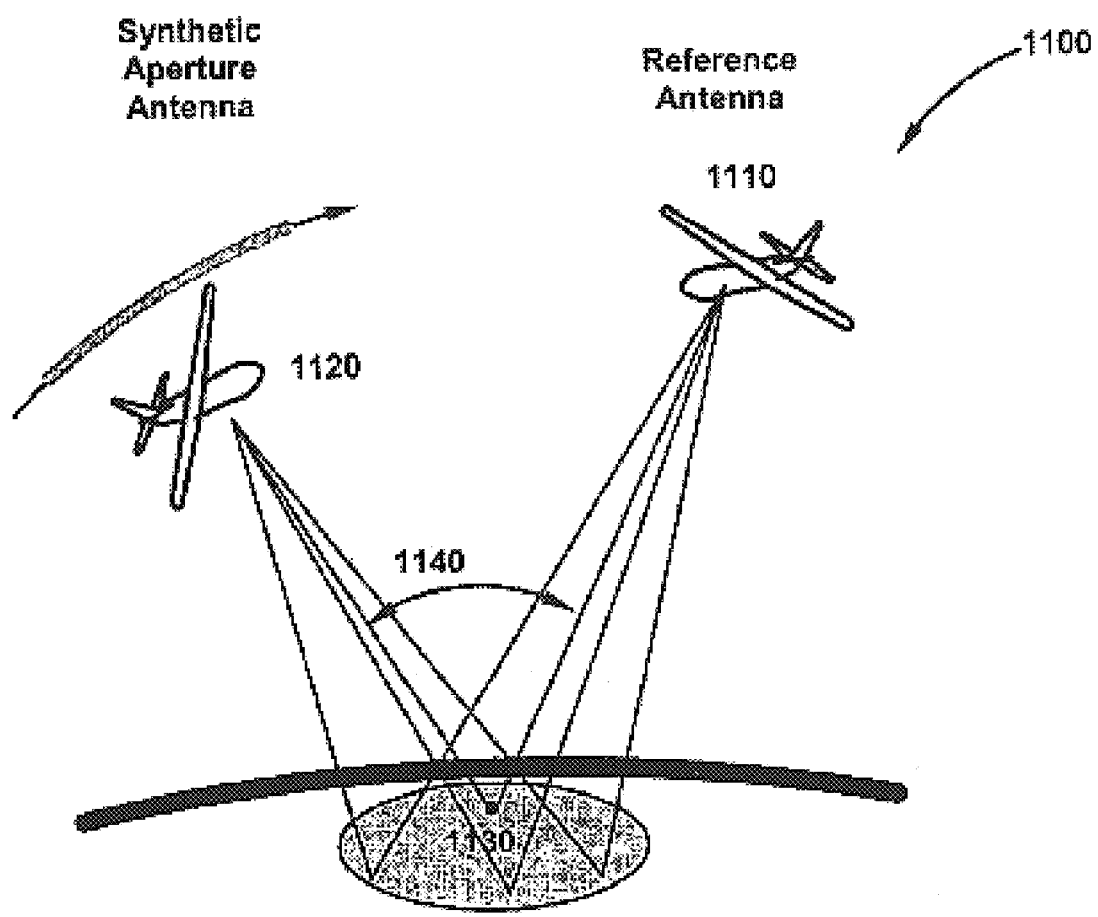
Figure 11:
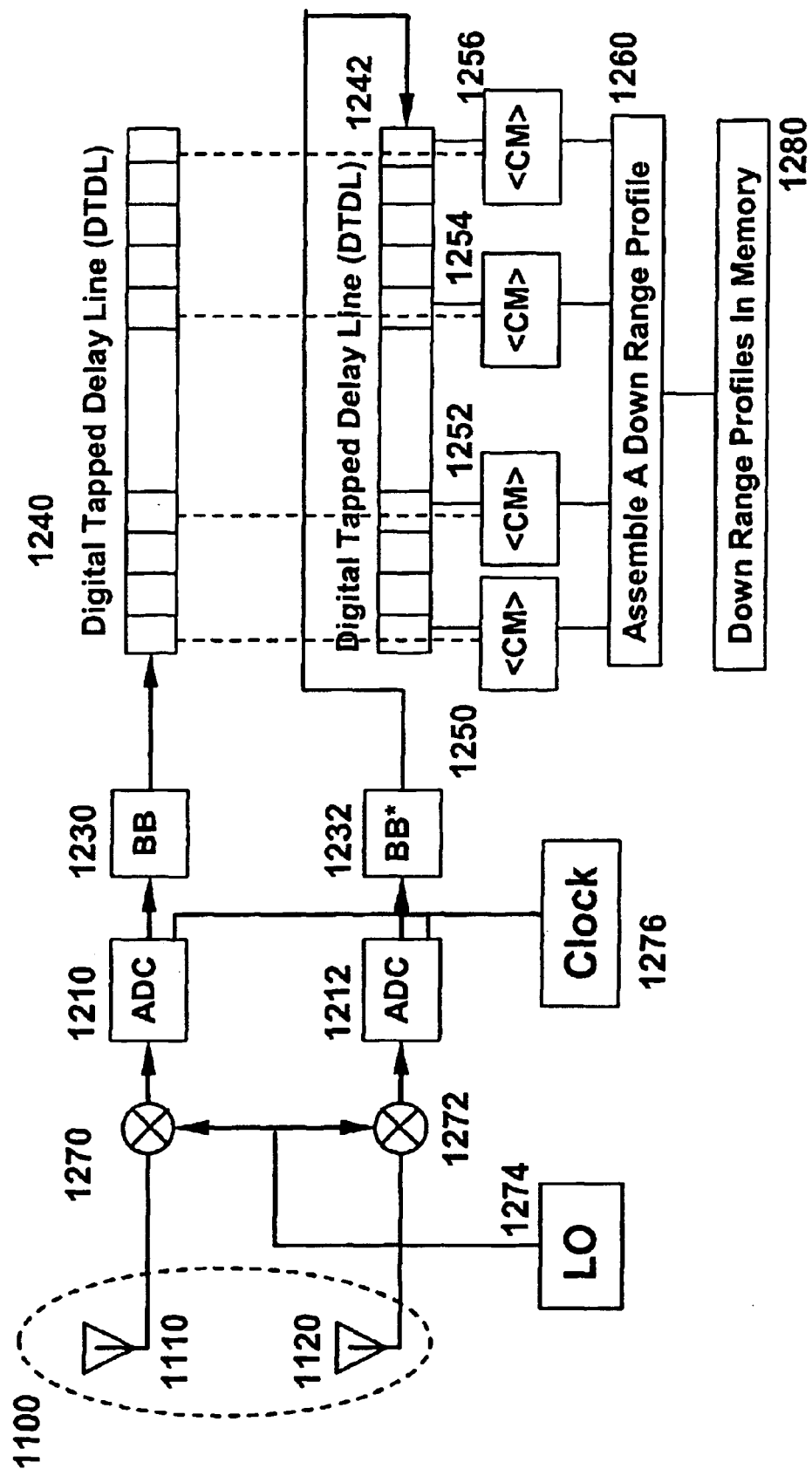
FIG. 11 is a simplified block diagram of a system for mutual coherent synthetic aperture radiometry according to an embodiment of the present invention.

FIGS. 10(a) and (b) are block diagrams of exemplary systems for performing mutual coherent synthetic aperture radiometry according to an embodiment of the present invention. Antenna system 1100 includes antenna 1110 and antenna 1120. Both antennas are located at substantially the same distance from target area 1130. For example, in FIG. 10(a), antenna 1110 and antenna 1120 are placed on spacecraft, while in FIG. 10(b), antenna 1110 and antenna 1120 are placed on aircraft. Antenna 1110 is a reference antenna, and it moves slower than antenna 1120 relative to target area 1130. As shown in FIGS. 11(a) and (b), look angle 1140 is defined by the angle between the line connecting antenna 1110 and target area 1130 and the line connecting antenna 1120 and target area 1130. Look angle 1140 could range between 10 and 160 degrees, and preferably between 20 to 90 degrees. The signals collected by antennas 1110 and 1120 are processed by a system as shown in FIG. 11.

FIG. 11 is a block diagram of a system for performing mutual coherent synthetic aperture radiometry according to an embodiment of the present invention. System 1200 includes among others, antenna system 1100 comprising antennas 1110 and 1120, mixers 1270 and 1272, analog to digital converters ("ADCs") 1210 and 1212, baseband converter ("BB") 1230, conjugate baseband converter ("BB*") 1232, digital tapped delay line circuits ("DTDLs") 1240 and 1242, correlation modules ("CMs") 1250, 1252, 1254, and 1256, and system 1260 for assembling a down range profile, and system 1280 for storing down range profiles in memory The signals received by antennas 1110 and 1120 are converted to intermediate frequency signals by mixers 1270 and 1272. ADCs 1210 and 1212 digitize the intermediate signals respectively. The digitized intermediate frequency signals are further down converted to baseband by BB 1230 and BB* 1232. Module BB 1230 performs baseband down conversion without conjugation. Module BB* 1232 performs baseband down conversion with conjugation. The digitized baseband signals are further delayed by DTDLs 1240 and 1242 respectively. The outputs of DTDLs 1240 and 1242 are multiplied and summed by correlation modules ("CMs") 1250, 1252, 1254, and 1256. The outputs from CMs 1250, 1252, 1254, and 1256 is a set of cross correlation data, which is a complex valued time delay profile. A complex valued time delay profile is converted into a complex valued radial down range profile by module 1260. An assemblage of the complex valued radial down range profile are stored in memory 1280, awaiting for further processing.

The signals received by antennas 1110 and 1120 during a pre-determined interval are used to produce a single complex valued radial down range profile. The signals received by antennas 1110 and 1120 from a plurality of pre-determined intervals are used to produce a plurality of complex valued radial down range profiles. The complex valued time delay profiles are translated into complex valued radial down range profiles of the source brightness function target according to Equation 37.

Figure 12:
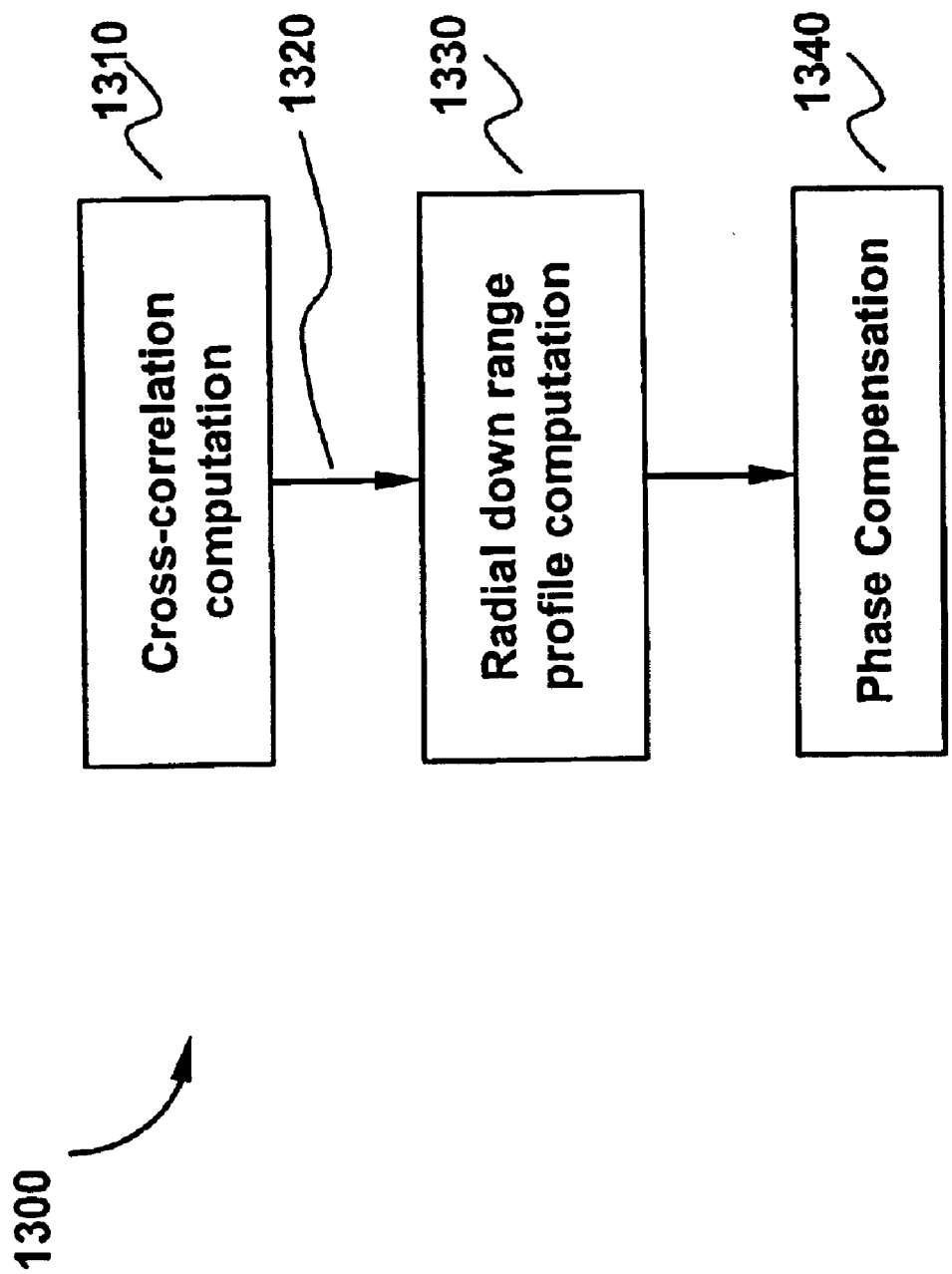
FIG. 12 is a simplified block diagram of a method for mutual coherent synthetic aperture radiometry according to an embodiment of the present invention.

FIG. 12 is a block diagram of a method for mutual coherent synthetic aperture radiometry according to an embodiment of the present invention. The method may uses antenna system 1100 as shown in FIGS. 10(a) and (b). Method 1300 includes three processes: cross-correlation computation process 1310, radial down range profile computation process 1330, and phase compensation process 1340.

At cross-correlation computation process 1310, the expectations of the cross-correlation between the signals received by antennas 322 and 324 within a pre-determine time interval are calculated. This calculation is performed for all relevant relative time-delays between the signals. The result of the calculation is complex valued time-delay profile 1320. This profile is associated with the signals collect when antenna 324 is moving along a pre-determined segment of synthetic aperture 430. Successive time-delay profiles 1320 are computed. These time delay profiles 1320 are associated with successive segments of synthetic aperture 430, as antenna 324 moves relative to antenna 322. Consequently a set of $\Gamma(U,\tau)$ is computed. At radial down range profile computation process 1330, complex valued time delay profiles are converted to complex valued radial down range profiles, and these profiles are individually and appropriately shifted in range to ensure the center of all the complex valued radial down range profiles is aligned with the center of the source brightness function. At phase compensation process 1340, the phase of complex valued radial down range profiles are phase compensated to ensure coherence across all radial down range profiles. This is accomplished by transforming individual radial down range profiles into radial spatial frequencies based on the projection-slice theorem. The entire set of radial spatial frequencies is fitted by least squares means and mapped onto a two-dimensional spatial frequency domain and on a regularly spaced grid. After phase compensation process 1340, the resultant data is ready for further processing for image formation purpose. For example, a two-dimensional Fourier transform may be applied to the resultant to construct an image of the source brightness function.

Figure 13:
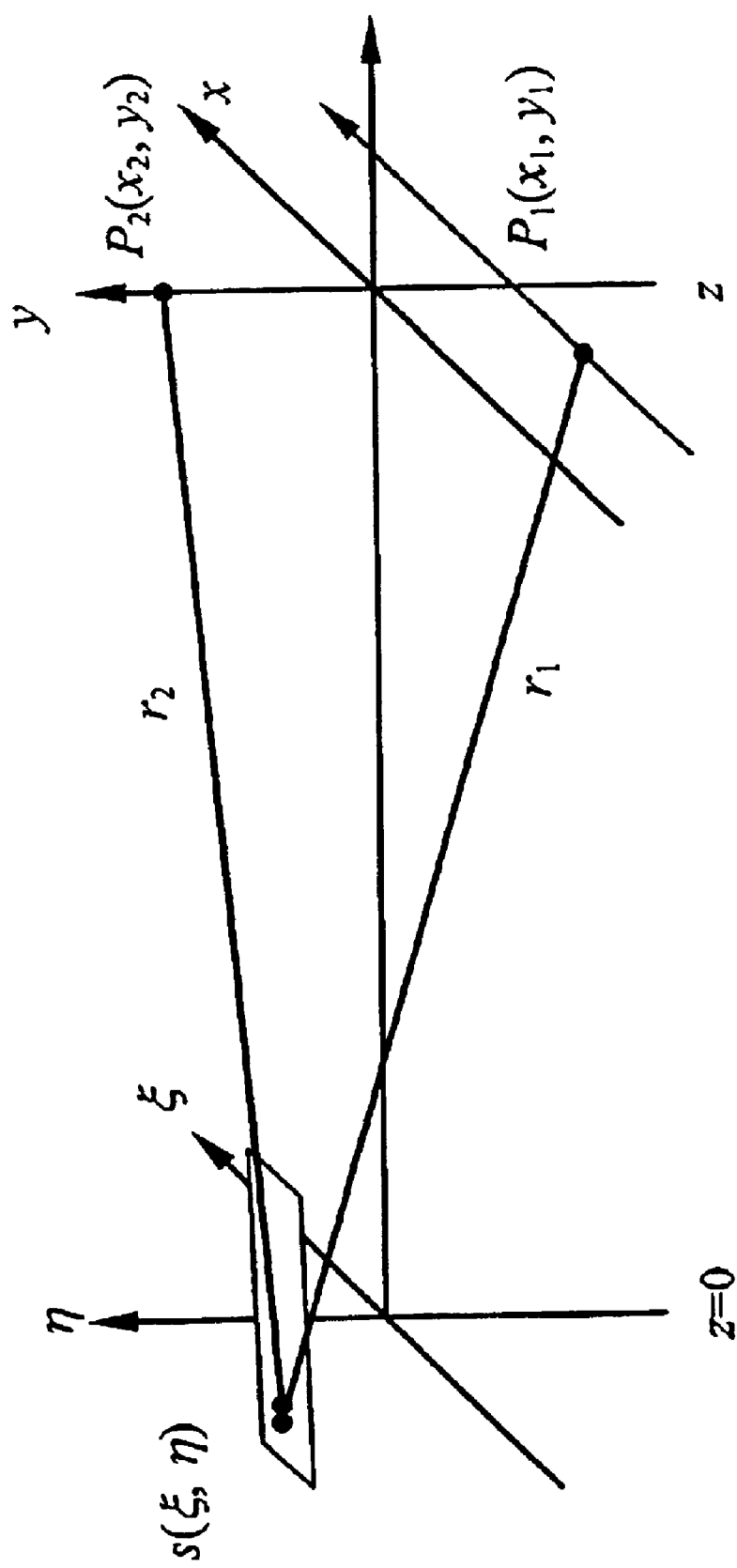
FIG. 13 illustrates simplified operations of system and method for mutual coherent synthetic aperture radiometry using the antenna system as shown in FIGS. 10(a) and 10(b).

FIG. 13 illustrates in detail some operations of system and method for mutual coherent synthetic aperture radiometry using the antenna system as shown in FIGS. 11(a) and 11(b). In FIG. 13, the two antenna receivers are located at approximately the same distance from an extended thermal emission source $s(\xi,\eta)$. They define a baseline, which is the vector that connects the receivers. The receiver at $P_2$ is assumed to be stationary, although this is not a requirement. This receiver serves as a reference receiver. The receiver at $P_1$ moves relative to the first receiver and to the scene, along a path parallel to the x-axis as shown. The signals collected by the antenna receivers at $P_1$ and $P_2$ are denoted $u(P_1,t)$ and $u(P_2,t)$.

In FIG. 13, a particular strip of an extended thermal emission source, $s(\xi,\eta,t)$, is illustrated. The strip is oriented at an angle, which is perpendicular to the projection of the baseline of the two antenna receivers on the $(\xi,\eta)$ plane. This strip represents a contour of constant path difference. In other words, along this strip, the path difference $(r_1-r_2)$ is a constant. An elemental mutual coherence function is $$<s(\xi,\eta,t-(r_1-r_2)/c+\tau)s^*(\xi,\eta,t)>d\xi d\eta \quad \text{(Equation 44)}$$

and by definition the elemental mutual coherence function reaches a maximum at $(r_1-r_2)/c-\tau=0$. Recall the expression for the mutual coherence function, which is Equation 39, $$\Gamma(\Delta x, \Delta y, \tau) = \exp\left\{\frac{jk}{2z_o}\{P_2^2 - P_1^2\}\right\} \times \frac{1}{z_o^2} \times \int |b(\xi',\eta')|^2 \exp\left\{-\frac{jk}{z_o}((\Delta x\cos\theta + \Delta y\sin\theta)\xi' + (\Delta y\cos\theta - \Delta x\sin\theta)\eta')\right\}\gamma(\tau - p(\eta'))d\xi' d\eta' \quad \text{(Equation 45)}$$

where $\gamma(\tau-p(\eta'))$ is an impulse-like function, and $\xi'$, $\eta'$ respectively are referred to as the radial cross-range and radial down-range. This coordinate system is defined by rotating the axes, $\xi$ and $\eta$, clockwise by the angle $\theta$. The paraxial assumption, $\Delta y>>\Delta x$ and $|\sin\theta|<<1$, is invoked to simplify Equation 45. With $$P_2^2 = \left(\frac{\Delta y}{2}\right)^2 \text{ and } P_1^2 = \left(\frac{\Delta y}{2}\right)^2 + \Delta x^2 \quad \text{(Equation 46)}$$

Equation 45 is approximated by $$\Gamma(\Delta x, \Delta y, \tau) \approx \exp\left\{\frac{jk}{2z_o}\Delta x^2\right\} \times \frac{1}{z_o^2} \times \int |b(\xi,\eta)|^2 \exp\left\{-\frac{jk}{z_o}(2\Delta x\xi + \Delta y\eta)\right\}\gamma\left(\tau - \frac{\Delta y\eta}{z_o c}\right)d\xi d\eta, \quad \text{(Equation 47)}$$

where a number of approximations and substitutions are made. The approximations are $\xi\approx\xi'$, $\eta\approx\eta'$, and $$\gamma\left(\tau - \frac{P_1^2 - P_2^2}{2z_o c} - \frac{\Delta x\xi + \Delta y\eta}{z_o c}\right) = \gamma\left(\tau - \frac{\Delta x^2}{8z_o c} - \frac{\Delta x\xi + \Delta y\eta}{z_o c}\right) \approx \gamma\left(\tau - \frac{\Delta x^2}{8z_o c} - \frac{\Delta x\xi + \Delta y\eta}{z_o c}\right). \quad \text{(Equatoin 48)}$$

Therefore $$\Gamma(U,\tau) \approx \exp\left\{\frac{jk}{2z_o}\Delta x^2\right\}\frac{\exp\{-j2\pi f_o\tau\}}{z_o^2}\int |b(\xi,\eta)|^2 \exp\{-jU\xi\}d\xi, \quad \text{(Equation 49)}$$

where $$U = \frac{4\pi\Delta x}{\lambda z_o} \quad \text{(Equation 50)}$$

It should be noted that the exponential factor $\exp\{-j2\pi f_o\tau\}=\exp\{-j2\pi c\tau/\lambda\}$ is the result of an evaluation of the integral in Equation 37, based on the assumption that $\gamma(\tau)$ is an impulse-like function. Therefore this factor can not be eliminated by a frequency down conversion process.

The resolution in time-delay is $\tau_c$, and the equivalent resolution in path difference is $\Delta r=\tau_c c$ or $\Delta r=c/\Delta f$. Thus the down range resolution, or the spatial resolution along the $\eta$ dimension on the plane of the thermal source is approximately $$\Delta\eta \approx \frac{c}{\Delta f}\frac{z}{\Delta y}, \quad \text{(Equation 51)}$$

where $\Delta y$ is the baseline of the two receivers and $z$ is the distance from the antenna receivers to the scene to be imaged. For an extremely large baseline, it can be shown that $$\Delta\eta \approx \frac{c}{\Delta f}\frac{1}{2\sin\frac{\theta}{2}} \quad \text{(Equation 52)}$$

where $\theta$ is the difference in the look angles between the receivers looking at the center of the scene. Table 1 illustrates the relationship between bandwidth and resolution in the path-difference $\Delta r$ based on several values of bandwidth. To maximize down range resolution, the factor $z/\Delta y$ should be made to be as small as possible. The optimal baseline is not infinity, which corresponds to $\theta=180°$. The optimal look angle depends on the physical characteristics of the scene and other system considerations. The preferable look angle may be between 10 to 160 degrees. Table 1 is an illustration between the relationship between radial down range resolution and the bandwidth of the receivers used for McSAR in accordance with Equation 52 for the case where $\theta=60°$. An equivalent relationship between the radial down range resolution and receiver bandwidth may not exist for conventional aperture synthesis imaging systems.

TABLE 1

Examples of Resolution and Bandwidth

| $\Delta r = \frac{c}{\Delta f}$ | $1/\Delta f$ | $\Delta f$ |
|---|---|---|
| 25 meters | 333 nsec | 6 MHz |
| 2.5 meters | 33.3 nsec | 60 MHz |
| 0.25 meter | 3.33 nsec | 600 MHz |

An image of the scene could be obtained by translating receiver at $P_1$ relative to $P_2$ by a distance of D, where D denotes the length of a synthetic aperture. At each point of along the synthetic aperture the data collected by receivers at $P_1$ and $P_2$ are correlated with all relevant values of time delay to compute the mutual coherence function shown in Equation 35. The result is a radial down range profile of the scene. It should be noted that each radial down range profile must be phase compensated to account for the phase terms in front of the integral in Equation 35. Assemblages of time-delay profiles are mapped to radial down range profiles, range shifted, gain and phase compensated, and interpolated onto a two-dimensional grid. At this point, the format of the data is similar to that of the synthetic aperture radar phase history data and may be further processed according to the principle of synthetic aperture radar image processing to obtain an image of the scene.

The cross range of the scene is obtained by applying a one dimensional Fourier transform to the cross spatial frequency data. From Equation 47, the spatial resolution along the $\xi$ dimension on the plane of the thermal source is approximately $$\Delta \xi \approx \frac{\lambda z_o}{2D}, \qquad \text{(Equation 53)}$$

where λ is the average wavelength of the thermal emission signal, and D is the length of the synthetic aperture.

Figure 14:
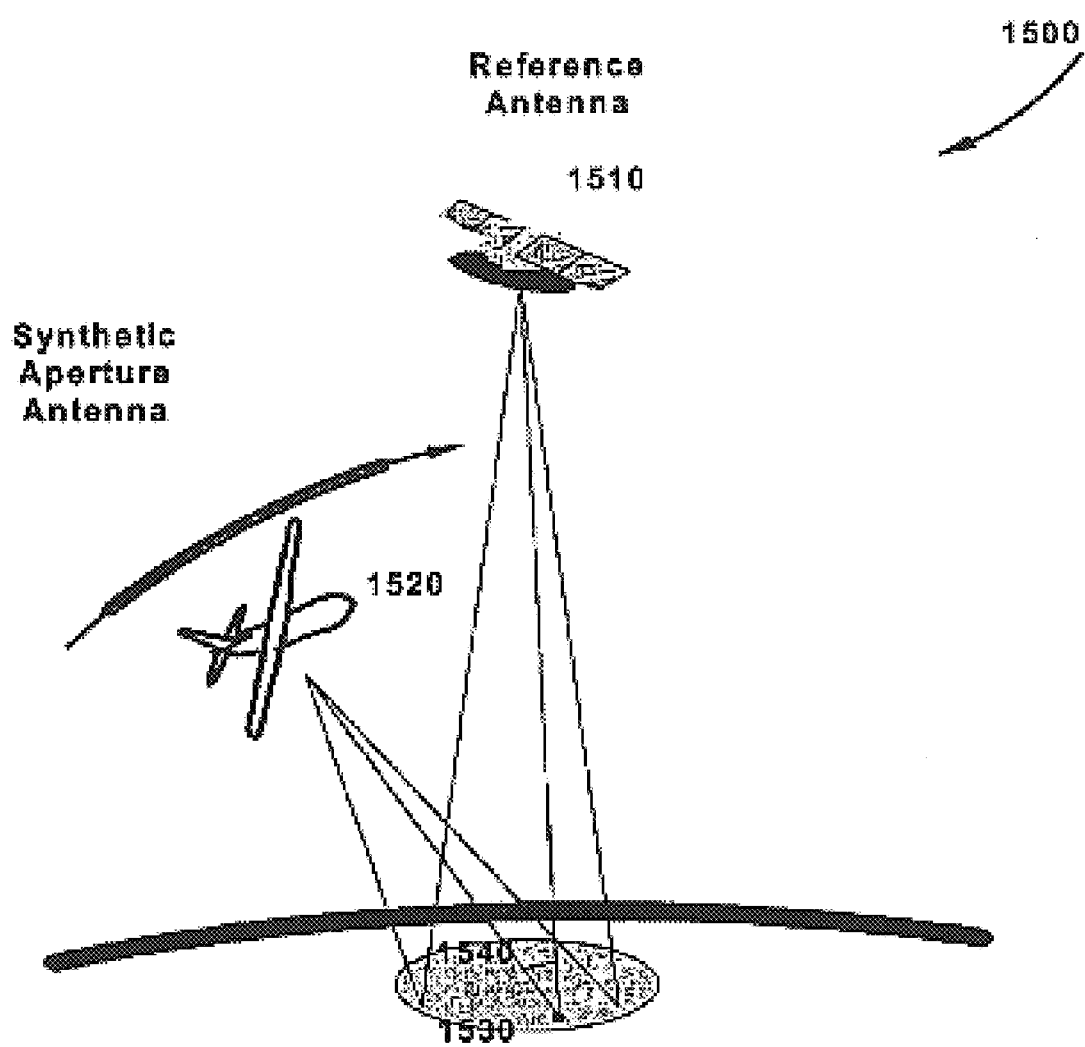
FIG. 14 is a simplified block diagram of an antenna system for mutual coherent synthetic aperture radiometry according to another embodiment of the present invention.

FIG. 14 is a block diagram of an antenna system for mutual coherent synthetic aperture radiometry according to another embodiment of the present invention. Antenna system 1500 includes antennas 1510 and 1520. Antenna 1510 is located farther from target area 1530 than antenna 1520 is located from target area 1530. In addition, antenna 1510 moves slower than antenna 1520 with respect to target area 1530. Antenna 1510 is designated to be a reference antenna. As an example, antenna 1510 may be placed on a spacecraft located on a geo-stationary orbit, while antenna 1520 may be placed on an aircraft. Look angle 1540 is specified by the lines connecting from antenna 1510 to target area 1530 and from antenna 1520 to target area 1530. Look angle could range between 10 and 160 degrees, and preferably between 20 to 60 degrees. The signals collected by antennas 1510 and 1520 are processed by the system shown in FIG. 15.

Figure 15:
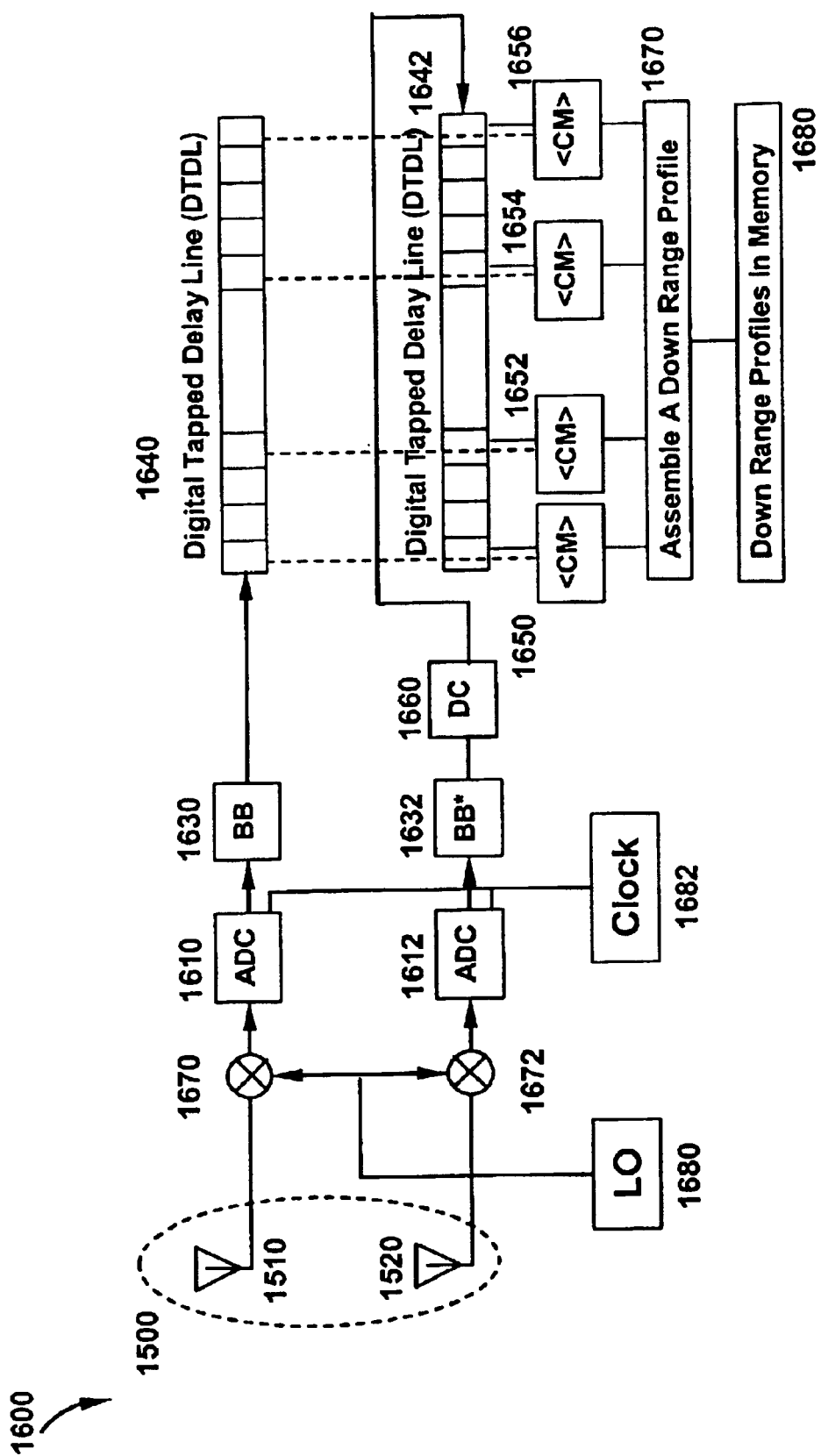
FIG. 15 is a simplified block diagram of a system for mutual coherent synthetic aperture radiometry according to another embodiment of the present invention.

FIG. 15 is a block diagram of a system for mutual coherent synthetic aperture radiometry according to another embodiment of the present invention. System 1600 includes among others, antenna system 1500 comprising antennas 1510 and 1520, mixers 1670 and 1672, analog to digital converters ("ADCs") 1610 and 1612, baseband converter ("BB") 1630, conjugate baseband converter ("BB*") 1632, digital tapped delay line circuits ("DTDLs") 1640 and 1642, correlation modules ("CMs") 1650, 1652, 1654, and 1656, system 1670 for assembling a down range profile, and system 1680 for storing down range profiles in memory. In addition, system 1600 includes Doppler shift compensator ("DC") 1660. DC 1660 provides a continuously rotating phase vector, which rotates at a pre-determined rate and is added to the signal received by antenna 1520. The objective of DC 1660 is to compensate for the Doppler frequency shift effect in the signal received by antenna 1520. Otherwise, the operations of system 1600 is similar to that for system 1200 as discussed above.

Moreover, the method for mutual coherent synthetic aperture radiometry that uses antenna system 1500 is similar to method 1300 as shown in FIG. 12, except that the signals received by antenna 1520 are continuously phase rotated at a deterministic rate to compensate for the Doppler effect.

Figure 16:
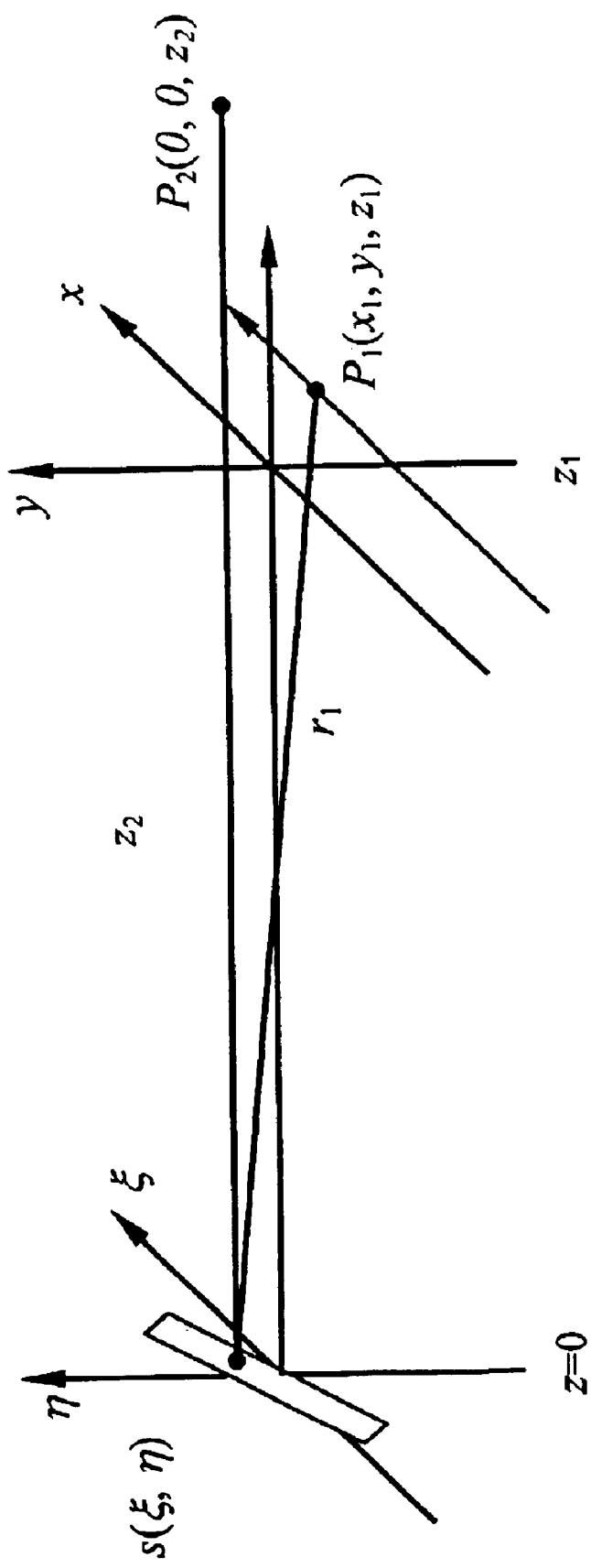
FIG. 16 illustrates simplified operations of system and method for mutual coherent synthetic aperture radiometry using the antenna system as shown in FIG. 14.

FIG. 16 illustrates in detail some operations of system and method for mutual coherent synthetic aperture radiometry using the antenna system as shown in FIG. 14. The first antenna receiver, a stationary receiver located at $P_2(0,0,z_2)$, which is located at a great distance from the thermal scene to be imaged. The second receiver is a mobile receiver that is moving along a path described by $P_1(x_1=vt,y_1,z_1)$, where $z_2 >> z_1$.

From Equation 17, the mutual coherence function is $$\langle u(P_1, t+\tau) u^*(P_2, t) \rangle = \qquad \text{(Equation 54)}$$

$$\int \frac{\langle s(\xi, \eta, t-(r_1-z_2)/c+\tau) s^*(\xi, \eta, t) \rangle}{r_1 z_2} d\xi d\eta.$$

If the coherence time of the receiver is much shorter than the time delays across the scene, then the mutual correlation function must be evaluated for all relevant values of τ. With the approximation of $$r_1 = \sqrt{z_1^2 + (x_1-\xi)^2 + (y_1-\eta)^2} \approx \qquad \text{(Equation 55)}$$

$$z_1 \left(1 + \frac{(x_1-\xi)^2 + (y_1-\eta)^2}{2z_1^2}\right)$$

$$\frac{r_1-z_2}{c} + \tau \approx z_1 - z_2 + \frac{(x_1-\xi)^2+(y_1-\eta)^2}{2z_1 c} \approx \qquad \text{(Equation 56)}$$

$$\frac{z_1-z_2}{c} + \frac{1}{2z_1 c}\{P_1^2 + 2\Delta x\xi + 2\Delta y\eta + \xi^2 + \eta^2\} + \tau,$$

where $P_1^2 = (x_1^2+y_1^2)$, $\Delta x = -x_1$, and $\Delta y = -y_1$. Hence, $$s(\xi, \eta, t-(r_1-z_2)/c+\tau) = \qquad \text{(Equation 57)}$$

$$b(\xi, \eta, t-(r_1-z_2)/c+\tau) \times \exp\left\{j2\pi f_o\left(t + \frac{z_2-z_1}{c} - \right.\right.$$

$$\left.\left. \frac{1}{2z_o c}\{P_1^2 + 2\Delta x\xi + 2\Delta y\eta + \xi^2 + \eta^2\} + \tau\right)\right\} \text{ and}$$

$$s^*(\xi, \eta, t) = b^*(\xi, \eta, t)\exp\{j2\pi f_o t\}. \qquad \text{(Equation 58)}$$

The mutual coherence function is $$\langle u(P_1, t+\tau) u^*(P_2, t) \rangle = \qquad \text{(Equation 59)}$$

$$\exp\left\{jk\{z_2-z_1\} - j\frac{kP_1^2}{2z_o} + j2\pi f_o \tau\right\} \times \frac{1}{z_1 z_2}$$

$$\int \langle b(\xi, \eta, t-(r_1-z_2)/c+\tau) b^*(\xi, \eta, t) \rangle$$

$$\exp\left\{-\frac{jk}{2z_o}\{2\Delta x\xi + 2\Delta y\eta + \xi^2 + \eta^2\}\right\} d\xi d\eta$$

The baseband version of the mutual coherence function would not contain the exponential term $\exp\{+j2\pi f_o\tau\}$ since this time delay imposed after the operation of frequency down-converting the received thermal emission signals to base-band.

Figure 17:
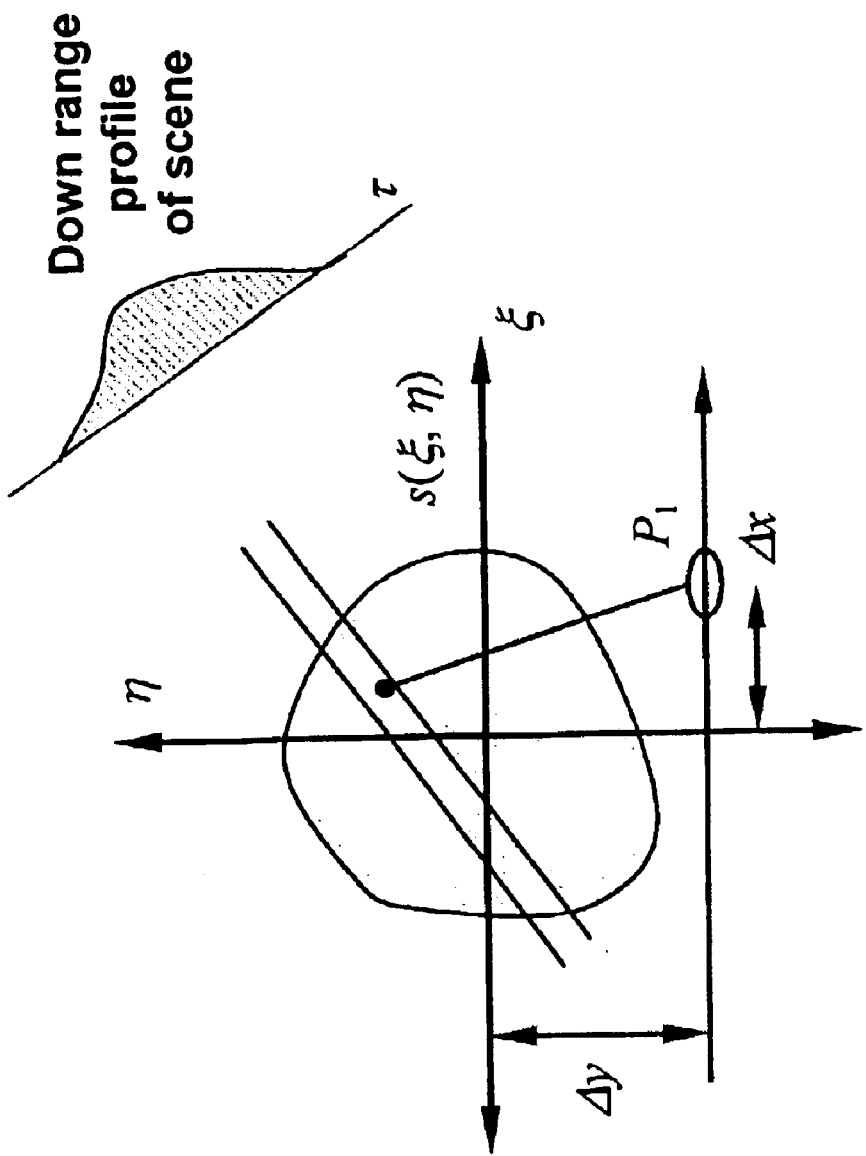
FIG. 17 illustrates a simplified geometry for an embodiment of the present invention that uses the antenna system as shown in FIG. 14.

FIG. 17 illustrates the geometry for an embodiment of the present invention that uses the antenna system as shown in FIG. 14. The stationary receiver is high above the scene. The mobile receiver at $P_1$ is located at a moderate height above the scene. The dimensions (Δx,Δy) are parameters that are relevant to the formation of mutual coherent synthetic aperture images according to Equations 50 and 51. The data collected by the receiver are used to estimate the complex valued down range profile of the scene, and the magnitude of which is illustrated at the upper right hand corner of FIG. 17.

From Equation 59, the radial down-range and cross range resolutions are Δη and Δξ. Δη and Δξ are $$\Delta\eta \approx \frac{2c}{\Delta f}\frac{z_1}{\Delta y} \text{ and } \Delta\xi \approx \frac{\lambda z_1}{2D}. \qquad \text{(Equation 60)}$$

In addition, signal received by the mobile receiver at $P_1$ is Doppler shifted in frequency. The effect of Doppler shift must be compensated before the cross-correlation and time-averaging. More specifically, the relatively slow moving reference receiver collects a signal from the entire scene, and the signal serves as a reference signal for cross correlation. The reference signal is not Doppler shifted. The signals collected by mobile receivers are Doppler shifted.

The amount Doppler shift is $f_D$, where the apparent frequency $f=f_0+f_D$. For the geometry illustrated in FIG. 17, the Doppler frequency is $$f_D = f_0 \frac{v_1 \cos\theta}{c} \approx f_0 \frac{v_1(\xi - x_1)}{cz_1} \qquad \text{(Equation 61)}$$

where $f_0$ denotes the center frequency of the thermal emission, c the speed of light, $v_1$ the velocity of the receiver at $P_1(x_1,y_1,z_1)$, cos θ the directional cosine between the velocity and position vectors, $\vec{v}_1$ and $\vec{r}_1$, and ($\xi-x_1$) the horizontal spatial difference from the receiver to an elemental thermal emission area, s($\xi,\eta$)d$\xi$d$\eta$, and $z_1$ the distance from the plane of the receiver to the plane of the thermal emission source.

At every position of $P_1(x_1,y_1,z_1)$, the average Doppler frequency is $$f_D \approx f_0 \frac{v_1 x_1}{cz_1}.$$

The Doppler frequency varies over $\xi$ because of $$f_0 \frac{v_1 \xi}{cz_1}.$$

Recall Equations 18 and 19, accounting for the Doppler shift effect, the signal from an elemental source s($\xi,\eta$)d$\xi$d$\eta$ received by the moving receiver at $P_1(x_1,y_1,z_1)$ is $$s(\xi, \eta, t, x_1, y_1, z_1, v_1) = \qquad \text{(Equation 62)}$$

$$b\left(\xi, \eta, t\left(1 + \frac{v_1(\xi - x_1)}{cz_1}\right) - (r_1 - r_2)/c + \tau\right) \times$$

$$\exp\left\{j2\pi f_0\left(t\left(1 + \frac{v_1(\xi - x_1)}{cz_1}\right) - \frac{1}{2zc}\{P_1^2 - P_2^2 + 2\Delta x\xi + 2\Delta y\eta\} + \tau\right)\right\},$$

The signal from the same elemental source received by the relatively stationary receiver at $P_2(x_2,y_2,z_2)$ is $$s^*(\xi, \eta, t - \tau, x_1, y_1, z_1) = b^*(\xi, \eta, t, x_2, y_2, z_2)\exp(-j\pi f_0 t). \qquad \text{(Equation 63)}$$

The mutual coherence function based on the signals received at $P_1$ and $P_2$ is the sum of all the elemental mutual coherence function due to s($\xi,\eta,t,x_1,y_1,z_1$) and s($\xi,\eta,t,x_2,y_2,z_2$), which is expressed by $$s(\xi, \eta, t - \tau, x_1, y_1, z_1)s^*(\xi, \eta, t, x_2, y_2, z_2) = \qquad \text{(Equation 64)}$$

$$b\left(\xi, \eta, t\left(1 + \frac{v_1(\xi - x_1)}{cz_1}\right) - (r_1 - r_2)/c + \tau\right)b^*(\xi, \eta, t) \times \exp$$

$$\left\{-\frac{jk}{2z}\{P_1^2 - P_2^2 + 2\Delta x\xi + 2\Delta y\eta\} + j2\pi f_0\tau + j\pi f_D t\right\}.$$

Regrouping the terms in Equation 64, the mutual coherence function is $$\langle u(P_1, t + \tau)u^*(P_2, t)\rangle = \exp\left\{\frac{jk}{2z}\{P_2^2 - P_1^2\} + j2\pi f_0\tau\right\} \times \qquad \text{(Equation 65)}$$

$$\int \frac{\langle\Theta\exp\{j2\pi f_D t\}\rangle}{r_1 r_2}\exp\left\{-\frac{jk}{2z}\{2\Delta x\xi + 2\Delta y\eta\}\right\}d\xi d\eta$$

where Θ = \qquad (Equation 66)

$$b\left(\xi, \eta, t\left(1 + \frac{v_1(\xi - x_1)}{cz_1}\right) - (r_1 - r_2)/c + \tau\right)b^*(\xi, \eta, t).$$

Let's assume the parameter τ is chosen to be τ=($r_2-r_1$)/c, then $$\Theta = b\left(\xi, \eta, t\left(1 + \frac{v_1(\xi - x_1)}{cz_1}\right)\right)b^*(\xi, \eta, t). \qquad \text{(Equation 67)}$$

If the Doppler factor is small, $$\frac{v_1(\xi - x_1)}{cz_1} \ll 1,$$

then the phase of Θ is a slow varying function of ($\xi-x_1$), and its magnitude is $$b\left(\xi, \eta, t\left(1 + \frac{v_1(\xi - x_1)}{cz_1}\right)\right)b^*(\xi, \eta, t) \approx |b(\xi, \eta, t)|^2 \qquad \text{(Equation 68)}$$

Equation 12 is approximated by $$\langle u(P_1, t + \tau)u^*(P_2, t)\rangle = \exp\left\{\frac{jk}{2z_o}\{P_2^2 - P_1^2\}\right\} \times \qquad \text{(Equation 69)}$$

$$\int \frac{\langle b(\xi, \eta, t - (r_1 - r_2)/c + \tau)b^*(\xi, \eta, t)\exp\{j2\pi f_D t\}\rangle}{z_1 z_2}$$

$$\exp\left\{-\frac{jk}{2z_o}\{2\Delta x\xi + 2\Delta y\eta\}\right\}d\xi d\eta$$

The exponential term exp{j2π$f_D$t} is included as part of the time-averaging process; thus the time-averaging interval must be much shorter than 1/2π$f_D$. Since there is an average Doppler frequency, $u_2(P_2,t)$ should be frequency shifted by an amount equal to the average Doppler shift.

Doppler shift compensation is applied to one of the signals to maximize the time-averaging interval of the correlation. At consecutive positions of $P_1(x_1,y_1,z_1)$, the associated data is processed to remove the quadratic phase term, $$\exp\left\{\frac{jk}{2z}\{P_2^2 - P_1^2\}\right\} \qquad \text{(Equation 70)}$$

in a manner similar to cross range SAR data processing. This step is applied to an entire block of data to obtain focusing. If the Γ(U,τ) data is collected for an extremely long synthetic aperture, a method similar to spot light mode SAR processing may be applied to compensate for down range migration.

Exemplary Advantages of McSAR

The present invention of McSAR as described above has several advantages. For example, certain embodiments of the present invention circumvent the monochromatic assumption that is the basis of the Van Cittert-Zernike theorem; as a result McSAR can be accomplished at lower cost because it requires only two receivers moving in relatively simple patterns. The conventional aperture synthesis imaging systems usually require at least two receivers moving in relatively complex patterns to collect interferometric fringe pattern data to fill the (U,V) plane. A conventional aperture synthesis imaging system that operates based on the Van Cittert-Zernike theorem usually cannot perform imaging using signals with substantially wider bandwidths. In contrast, systems and methods of McSAR are able to perform imaging using signals that occupy a bandwidth substantially more than a narrow band of frequencies. For example, one or both bandwidths of a reference antenna and a synthetic aperture antenna respectively may exceed 50 MHz, 300 MHz, or even 1 GHz. Consequently, McSAR could achieve a higher imaging resolution relative to conventional aperture synthesis imaging systems under some circumstances.

Exemplary Applications of McSAR

The present invention of McSAR has a wide range of applications. Methods and systems of McSAR as exemplified in above embodiments can be used for passive microwave remote sensing, including imaging the earth from the air or space. Other applications include geological survey. In addition, McSAR could be applied to develop an underwater acoustic imaging system. In a harbor or in an area where the acoustic reverberation of the underwater environment renders conventional sonar unsuitable, a mutual coherent acoustic correlative mapping system may be developed to track a target located within a complex underwater environment. Since correlation is one of the most sensitive and power signal feature analysis tool, an array of acoustic correlative receiver could track in time delay and angular of arrival domain. Alternatively, techniques of McSAR could be applied to develop a system to profile the seismic structure below a set of correlative receivers. Certain part of the earth crust may be constantly excited by the movement of magma that lies below an active volcano. The movement of the magma may provide an extended source of incoherent seismic emission that could be mapped using a set of correlative receivers.

It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A system for imaging a target, the system comprising:
 a first antenna configured to receive from an imaging target a first signal occupying a first bandwidth including substantially more than one frequency;
 a second antenna configured to receive from the imaging target a second signal occupying a second bandwidth including substantially more than one frequency and to perform a spatial movement relative to the first antenna, the spatial movement being associated with a synthetic aperture;
 a cross correlation receiver coupled to the first antenna and the second antenna, the cross correlation receiver configured to:
  process information associated with the first signal and the second signal; determine a cross correlation function based on at least information associated with the first signal and the second signal;
  wherein the cross correlation function is dependent upon at least a time interval between a first time when the first antenna receiving the first signal and a second time when the second antenna receiving the second signal;
  wherein the cross correlation function is associated with the synthetic aperture;
 a processing system coupled to the cross correlation receiver and configured to:
  determine a radial down range profile of the imaging target based on at least information associated with the cross correlation function;
  perform a phase compensation to the radial down range profile; form an image of the imaging target based on at least information associated with the phase-compensated radial down range profile;
  wherein the form an image of the imaging target uses at least an synthetic aperture imaging algorithm.

2. The system of claim 1 wherein the determine a cross correlation function comprises perform a far field approximation and determine the cross correlation function based on at least information associated with the far field approximation.

3. The system of claim 2 wherein the determine a cross correlation function further comprises determine the cross correlation function for a plurality of time delays, the plurality of time delays being associated with the first signal and the second signal and including the time interval.

4. The system of claim 2 wherein the form an image of the imaging target comprises determine a cross-range profile of the imaging target using at least the synthetic aperture imaging algorithm.

5. The system of claim 4 wherein the cross correlation receiver is further configured to compensate for a Doppler frequency shift between the first signal and the second signal before computing the cross correlation function related to the first signal and the second signal, the Doppler frequency shift being associated with the spatial movement of the first antenna relative to the second antenna.

6. The system of claim 5 wherein the synthetic aperture is associated with a continuous size in response to the spatial movement of the first antenna relative to the second antenna.

7. The system of claim 6 is free from any antenna in addition to the first antenna and the second antenna.

8. The system of claim 6 wherein the processing system is further configured to
 transform a plurality of time delay profiles into a plurality of radial down range profiles, the plurality of radial down range profiles including the radial down range profile;
 align the centroid of each of the plurality of radial down range profiles;
 perform a plurality of phase compensations to the plurality of centroid aligned radial down range profiles, the plurality of phase compensations including the phase compensation;
 form the image of the imaging target based on at least information associated with the plurality of phase compensated and aligned radial down range profiles.

9. The system of claim 8 wherein the processing system comprises:
 a plurality of analog to digital converters;
 a plurality of baseband converters coupled to the plurality of analog to digital converters;
 a plurality of digital tapped delay line circuits coupled to the plurality of baseband converters;
 a plurality of correlation modules coupled to the plurality of digital tapped delay line circuits;
 a memory system coupled to the plurality of correlation modules.

10. The system of claim 9 wherein the memory system is configured to store information associated with the plurality of radial down range profiles for the imaging target.

11. The system of claim 10 wherein the second antenna moves faster than the first antenna with respect to the imaging target.

12. The system of claim 11 wherein the first antenna and the second antenna are located at substantially the same distance from the imaging target and configured to cause the second antenna to move along a predetermined trajectory, the predetermined trajectory defining the synthetic aperture suitable to support the synthetic aperture imaging algorithm.

13. The system of claim 11 wherein the first antenna and the second antenna are located at substantially different distances from the imaging target and configured to cause the second antenna to move along a predetermined trajectory, the predetermined trajectory defining the synthetic aperture suitable to support the synthetic aperture imaging algorithm.

14. The system of claim 10 wherein the cross correlation receiver is configured to process at least two channels of signals, the at least two channels of signals occupying substantially the same frequency band, the same frequency band having a bandwidth substantially wider than a bandwidth of signals collected in accordance with the Van Cittert-Zernike theorem for collecting interferometric Γ(U, V) data for filling a (U,V) plane.

15. The system of claim 8 wherein the first bandwidth is larger than 50 MHz, and the second bandwidth is larger than 50 MHz.

16. The system of claim 15 wherein the first bandwidth is larger than 300 MHz, and the second bandwidth is larger than 300 MHz.

17. The system of claim 16 wherein the first bandwidth is larger than 1 GHz, and the second bandwidth is larger than 1 GHz.

18. The system of claim 8 wherein the first bandwidth and the second bandwidth fall within the microwave range.

19. The system of claim 18 wherein the image for the imaging target has a resolution of one foot.

20. The system of claim 8 wherein the first antenna and the second antenna perform passive microwave remote sensing.

21. The system of claim 8 wherein the first antenna and the second antenna perform a geological survey.

22. The system of claim 8 wherein the first antenna and the second antenna perform passive ground mobile target indication.

23. The system of claim 8 wherein the cross correlation function is a mutual coherence function.

24. The system of claim 8 wherein the imaging target is located on the Earth.

25. The system of claim 24 wherein the first antenna and the second antenna are located in the air or in space.

26. The system of claim 8 wherein the first antenna and the second antenna are placed on a first aircraft and a second aircraft respectively.

27. The system of claim 8 wherein the first antenna and the second antenna are placed on a first spacecraft and a second spacecraft respectively.

28. The system of claim 8 wherein the first antenna and the second antenna are placed on a spacecraft and an aircraft respectively.

29. The system of claim 8 wherein an angle between a first line connecting the first antenna and the imaging target and a second line connecting the second antenna and the imaging target ranges from 30 to 160 degrees.

30. The system of claim 29 wherein the angels ranges from 60 to 90 degrees.

31. The system of claim 8 wherein an angel between a first line connecting the first antenna and the imaging target and a second line connecting the second antenna and the imaging target ranges from 20 to 120 degrees.

32. The system of claim 31 wherein the angels ranges from 20 to 60 degrees.

* * * * *

UNITED STATES PATENT AND TRADEMARK OFFICE
CERTIFICATE OF CORRECTION

PATENT NO. : 6,861,978 B2
DATED : March 1, 2005
INVENTOR(S) : Lawrence K. Lam

It is certified that error appears in the above-identified patent and that said Letters Patent is hereby corrected as shown below:

Column 6,
Lines 3-5, " $\Gamma(P,P,\tau) = <u(P,t+\tau)u^*(P,t)> = <a(P,t+\tau)a^*(P,t)>\exp\{+j2\pi f_o\tau\}$. (Equation 4) " should read -- $\Gamma(P,P,\tau) = \langle u(P,t+\tau)u^*(P,t)\rangle = \langle a(P,t+\tau)a^*(P,t)\rangle \exp\{+j2\pi f_o\tau\}$ (Equation 4) --.

Lines 8-9, " $<a(P,t+\tau)a^*(P,t)> \approx 1$ for $\tau << \tau_c$ (Equation 5) " should read -- $\langle a(P,t+\tau)a^*(P,t)\rangle \approx 1$ for $\tau << \tau_c$ (Equation 5) --.

Lines 11-12, " $<a(P,t+\tau)a^*(P,t)> \approx 0$ for $\tau >> 1/\Delta f$. (Equation 6) " should read -- $\langle a(P,t+\tau)a^*(P,t)\rangle \approx 0$ for $\tau >> 1/\Delta f$. (Equation 6) --.

Lines 35-36, " $\Gamma(P_1,P_2,\tau=0) = <u(P_1,t)u^*(P_2,t)> = <a(P_1,t)a^*(P_2,t)>$. (Equation 9) " should read -- $\Gamma(P_1,P_2,\tau=0) = \langle u(P_1,t)u^*(P_2,t)\rangle = \langle a(P_1,t)a^*(P_2,t)\rangle$. (Equation 9) --.

Lines 53-54, " $<a(P_1,t+\tau)a^*(P_2,t)> \approx 1$ for $|P_1-P_2| << L$ (Equation 11) „ should read -- $\langle a(P_1,t+\tau)a^*(P_2,t)\rangle \approx 1$ for $|P_1-P_2| << L$ (Equation 11) --.

Lines 55-56, " $<a(P_1,t+\tau)a^*(P_2,t)> \approx 0$ for $|P_1-P_2| >> L$ (Equation 12) " should read -- $\langle a(P_1,t+\tau)a^*(P_2,t)\rangle \approx 0$ for $|P_1-P_2| >> L$ (Equation 12) --.

Column 7,
Lines 15-16, " $\Gamma(P_1,P_2,t) = <u(P_1,t+\tau)u^*(P_2,t)>$ (Equation 13) "

should read -- $\Gamma(P_1,P_2,t) = \langle u(P_1,t+\tau)u^*(P_2,t)\rangle$ (Equation 13) --.

UNITED STATES PATENT AND TRADEMARK OFFICE
CERTIFICATE OF CORRECTION

PATENT NO. : 6,861,978 B2
DATED : March 1, 2005
INVENTOR(S) : Lawrence K. Lam

It is certified that error appears in the above-identified patent and that said Letters Patent is hereby corrected as shown below:

<u>Column 7 (cont'd),</u>
Lines 28-29, "
$$u(P_1, t+\tau)u^*(P_2, t)) = \left\{ \int \frac{s(\xi_m, \eta_m, t-r_1/c+\tau)}{r_1} d\xi_m d\eta_m \times \int \frac{s^*(\xi_n, \eta_n, t-r_2/c)}{r_2} d\xi_n d\eta_n \right\}, \quad \text{(Equation 14)}$$
"

should read --
$$\langle u(P_1, t+\tau)u^*(P_2,t) \rangle = \left\langle \int \frac{s(\xi_m, \eta_m, t-r_1/c+\tau)}{r_1} d\xi_m d\eta_m \times \int \frac{s^*(\xi_n, \eta_n, t-r_2/c)}{r_2} d\xi_n d\eta_n \right\rangle, \quad \text{(Equation 14)}$$
--.

Lines 40-41, "
$$\langle s(\xi_m,\eta_m,t)s^*(\xi_n,\eta_n,t)\rangle = \langle s(\xi_m,\eta_m,t)\rangle\langle s^*(\xi_n,\eta_n,t)\rangle = 0, \text{ for } m \neq n. \quad \text{(Equation 15)}$$
" should read --
$$\langle s(\xi_m,\eta_m,t)s^*(\xi_n,\eta_n,t)\rangle = \langle s(\xi_m,\eta_m,t)\rangle\langle s^*(\xi_n,\eta_n,t)\rangle = 0, \text{ for } m \neq n. \quad \text{(Equation 15)}$$
--.

Lines 47-48, " $\langle s(\xi_m,\eta_m,t)s^*(\xi_n,\eta_n,t)\rangle = \langle s(\xi_m,\eta_m,t)\rangle\langle s^*(\xi_n,\eta_n,t)\rangle \approx 0$ (Equation 16) " should read -- $\langle s(\xi_m,\eta_m,t)s^*(\xi_n,\eta_n,t)\rangle = \langle s(\xi_m,\eta_m,t)\rangle\langle s^*(\xi_n,\eta_n,t)\rangle \approx 0$ (Equation 16) --.

<u>Column 9,</u>
Line 44, "$I(\xi, \eta)$" should read -- $I(\xi, \eta)$ denotes a --.

<u>Column 10,</u>
Lines 18-25, " $\langle s(\xi_3,\eta_3,t-(r_{13}-r_{23})/c+\tau_3)s^*(\xi_3,\eta_3,t)\rangle$ is maximum when
$(r_{13}-r_{23})/c-\tau_3=0$, and
$\langle s(\xi_4,\eta_4,t-(r_{14}-r_{24})/c+\tau_4)s^*(\xi_4,\eta_4,t)\rangle$ is maximum when
$(r_{14}-r_{24})/c-\tau_4=0$.
If $|\tau_3-\tau_4|>>\tau_c$, it follows that $\tau_3 \neq \tau_4$, and $\langle s(\xi_3,\eta_3,t-(r_{13}-r_{23})/c+\tau_4)s^*(\xi_3,\eta_3,t)\rangle \approx 0$, and $\langle s(\xi_4,\eta_4,t-(r_{14}-r_{24})/c+\tau_3)s^*(\xi_4,\eta_4,t)\rangle \approx 0$. (Equation 32)

UNITED STATES PATENT AND TRADEMARK OFFICE
CERTIFICATE OF CORRECTION

PATENT NO. : 6,861,978 B2
DATED : March 1, 2005
INVENTOR(S) : Lawrence K. Lam

It is certified that error appears in the above-identified patent and that said Letters Patent is hereby corrected as shown below:

Column 10 (cont'd), should read -- $\langle s(\xi_3,\eta_3,t-(r_{13}-r_{23})/c+\tau_3)s^*(\xi_3,\eta_3,t)\rangle$ is maximum when $(r_{13}-r_{23})/c-\tau_3=0$, and $\langle s(\xi_4,\eta_4,t-(r_{14}-r_{24})/c+\tau_4)s^*(\xi_4,\eta_4,t)\rangle$ is maximum when $(r_{14}-r_{24})/c-\tau_4=0$.

If $|\tau_3-\tau_4|\gg\tau_c$, it follows that $\tau_3\neq\tau_4$, and $\langle s(\xi_3,\eta_3,t-(r_{13}-r_{23})/c+\tau_4)s^*(\xi_3,\eta_3,t)\rangle\approx 0$, and $\langle s(\xi_4,\eta_4,t-(r_{14}-r_{24})/c+\tau_3)s^*(\xi_4,\eta_4,t)\rangle\approx 0$.      (Equation 32)

Column 12,

Line 26, " $<b(\xi,\eta,t-(r_1-r_2)/c+\tau)b^*(\xi,\eta,t)>d\xi d\eta$ " should read -- $\langle b(\xi,\eta,t-(r_1-r_2)/c+\tau)b^*(\xi,\eta,t)\rangle d\xi d\eta$ --.

Line 30, " $<b(\xi,\eta,t+\tau)b^*(\xi,\eta,t)>=|b(\xi,\eta)|^2\gamma(\tau)d\xi d\eta$. (Equation 33) " should read -- $\langle b(\xi,\eta,t+\tau)b^*(\xi,\eta,t)\rangle\approx|b(\xi,\eta)|^2\gamma(\tau)d\xi d\eta$      (Equation 33) --.

Column 13,

Line 6, " $\xi=\cos\theta\xi'-\sin\theta\eta'$, and $\eta=\sin\theta\eta'+\cos\theta\eta'$      (Equation 37) " should read -- $\xi=\cos\theta\,\xi'-\sin\theta\,\eta'$, and $\eta=\sin\theta\,\xi'+\cos\theta\,\eta'$      (Equation 37) --.

Column 14,

Line 53, " $|b(\xi,\eta)|^2=>b(\xi,\eta,t)b^*(\xi,\eta,t)>$ " should read -- $|b(\xi,\eta)|^2=\langle b(\xi,\eta,t)b^*(\xi,\eta,t)\rangle$ --.

Column 15,

Line 19, " $<b(\xi,\eta,t-(r_1-r_2)/c+\tau)b^*(\xi,\eta,t)>=|b(\xi,\eta)|^2\gamma(\tau)$.      (Equation 43) " should read -- $\langle b(\xi,\eta,t-(r_1-r_2)/c+\tau)b^*(\xi,\eta,t)\rangle=|b(\xi,\eta)|^2\gamma(\tau)$.      (Equation 43) --.

UNITED STATES PATENT AND TRADEMARK OFFICE
CERTIFICATE OF CORRECTION

PATENT NO. : 6,861,978 B2
DATED : March 1, 2005
INVENTOR(S) : Lawrence K. Lam

It is certified that error appears in the above-identified patent and that said Letters Patent is hereby corrected as shown below:

Column 17,

Line 8, " $<s(\xi,\eta,t-(r_1-r_2)/c+\tau)s^*(\xi,\eta,t)>d\xi d\eta$ (Equation 44) " should read -- $\langle s(\xi,\eta,t-(r_1-r_2)/c+\tau)\, s^*(\xi,\eta,t)\rangle d\xi d\eta$ (Equation 44) --.

Lines 14-20, " $\Gamma(\Delta x, \Delta y, \tau) = \exp\left\{\frac{jk}{2z_o}\{P_2^2 - P_1^2\}\right\} \times \frac{1}{z_o^2} \times$ (Equation 45)

$\int |b(\xi', \eta')|^2 \exp\left\{-\frac{jk}{z_o}((\Delta x\cos\theta + \Delta y\sin\theta)\xi' + (\Delta y\cos\theta - \Delta x\sin\theta)\eta')\right\}\gamma(\tau - p(\eta'))d\xi' d\eta'$ should read -- $\Gamma(\Delta x,\Delta y,\tau)=\exp\left\{\frac{jk}{2z_o}\{P_2^2-P_1^2\}\right\}\times\frac{1}{z_o^2}$ $\times \int |b(\xi',\eta')|^2 \exp\left\{-\frac{jk}{z_o}((\Delta x\cos\theta+\Delta y\sin\theta)\xi'+(\Delta y\cos\theta-\Delta x\sin\theta)\eta')\right\}$
$\gamma(\tau-p(\eta'))d\xi' d\eta'$ (Equation 45) --.

Line 47, "(Equatoin 48)" should read -- (Equation 48) --.

Column 18,
Lines 15-18, " $\Delta\eta \approx \frac{c}{\Delta f}\frac{1}{2\sin\frac{\theta}{2}}$ (Equation 52) " should read -- $\Delta\eta \approx \frac{c}{\Delta f}\frac{1}{2\sin\theta/2}$ (Equation 52) --.

UNITED STATES PATENT AND TRADEMARK OFFICE
CERTIFICATE OF CORRECTION

PATENT NO. : 6,861,978 B2
DATED : March 1, 2005
INVENTOR(S) : Lawrence K. Lam

It is certified that error appears in the above-identified patent and that said Letters Patent is hereby corrected as shown below:

Column 20,
Lines 6-10, " $\frac{r_1 - z_2}{c} + \tau \approx z_1 - z_2 + \frac{(x_1 - \xi)^2 + (y_1 - \eta)^2}{2z_1 c} \approx$ (Equation 56) " should $$\frac{z_1 - z_2}{c} + \frac{1}{2z_1 c}\{P_1^2 + 2\Delta x\xi + 2\Delta y\eta + \xi^2 + \eta^2\} + \tau,$$

read -- $\frac{r_1 - z_2}{c} + \tau \approx z_1 - z_2 + \frac{(x_1 - \xi)^2 + (y_1 - \eta)^2}{2z_1 c} + \tau$ $$\approx \frac{z_1 - z_2}{c} + \frac{1}{2z_1 c}\{P_1^2 + 2\Delta x\xi + 2\Delta y\eta + \xi^2 + \eta^2\} + \tau,$$ (Equation 56) --.

Column 21,
Lines 17-20, " $f_D \approx f_0 \frac{v_1 x_1}{c z_1}.$ " should read -- $\bar{f}_D \approx f_0 \frac{v_1 x_1}{c z_1}.$ --.

Line 45, " $s^*(\xi, \eta, t - \tau, x_1, y_1, z_1) = b^*(\xi, \eta, t, x_2, y_2, z_2)\exp(-j\pi f_0 t).$ (Equation 63) "

should read -- $s^*(\xi, \eta, t, x_2, y_2, z_x)$
$= b^*(\xi, \eta, t, x_2, y_2, z_x)\exp\{-j2\pi f_o t\}.$ (Equation 63) --.

Lines 53-58, " $s(\xi, \eta, t - \tau, x_1, y_1, z_1)s^*(\xi, \eta, t, x_2, y_2, z_2) =$ (Equation 64) " should $$b\left(\xi, \eta, t\left(1 + \frac{v_1(\xi - x_1)}{c z_1}\right) - (r_1 - r_2)/c + \tau\right)b^*(\xi, \eta, t) \times \exp$$

$$\left\{-\frac{jk}{2z}\{P_1^2 - P_2^2 + 2\Delta x\xi + 2\Delta y\eta\} + j2\pi f_o \tau + j\pi f_D t\right\}.$$

read -- $s(\xi,\eta,t-\tau,x_1,y_1,z_1)s^*(\xi,\eta,t,x_2,y_2,z_2)$
$= b\left(\xi,\eta,t\left(1+\frac{v_1(\xi-x_1)}{c z_1}\right)-(r_1-r_2)/c+\tau\right)b^*(\xi,\eta,t) \times$ (Equation 64) --.

$\exp\left\{-\frac{jk}{2z}\{P_1^2 - P_2^2 + 2\Delta x\xi + 2\Delta y\eta\} + j2\pi f_o \tau + j2\pi f_D t\right\}.$

UNITED STATES PATENT AND TRADEMARK OFFICE
CERTIFICATE OF CORRECTION

PATENT NO. : 6,861,978 B2
DATED : March 1, 2005
INVENTOR(S) : Lawrence K. Lam

It is certified that error appears in the above-identified patent and that said Letters Patent is hereby corrected as shown below:

Column 21 (cont'd),

Lines 63-66, " $\langle u(P_1, t+\tau)u^*(P_2, t)\rangle = \exp\left\{\frac{jk}{2z}\{P_2^2 - P_1^2\} + j2\pi f_o \tau\right\} \times$ (Equation 65)

$\int \frac{\langle \Theta \exp\{j2\pi f_D t\}\rangle}{r_1 r_2} \exp\left\{-\frac{jk}{2z}\{2\Delta x\xi + 2\Delta y\eta\}\right\} d\xi d\eta$ " should read -- $\langle u(P_1, t+\tau)u^*(P_2, t)\rangle$ $= \exp\left\{\frac{jk}{2z}\{P_2^2 - P_1^2\} + j2\pi f_o \tau\right\} \times$ $\int \frac{\langle \Theta \exp\{j2\pi f_D t\}\rangle}{r_1 r_2} \exp\left\{-\frac{jk}{2z}\{2\Delta x\xi + 2\Delta y\eta\}\right\} d\xi d\eta$ (Equation 65) --.

Column 22, Lines 28-34, " $\langle u(P_1, t+\tau)u^*(P_2, t)\rangle = \exp\left\{\frac{jk}{2z_o}\{P_2^2 - P_1^2\}\right\} \times$ (Equation 69)

$\int \frac{\langle b(\xi, \eta, t-(r_1-r_2)/c+\tau)b^*(\xi, \eta, t)\exp\{j2\pi f_D t\}\rangle}{z_1 z_2}$ $\exp\left\{-\frac{jk}{2z_o}\{2\Delta x\xi + 2\Delta y\eta\}\right\} d\xi d\eta$ "

should read -- $\langle u(P_1, t+\tau)u^*(P_2, t)\rangle = \exp\left\{\frac{jk}{2z_o}\{P_2^2 - P_1^2\}\right\} \times$ $\int \frac{\langle b(\xi, \eta, t-(r_1-r_2)/c+\tau)b^*(\xi, \eta, t)\exp\{j2\pi f_o t\}\rangle}{z_1 z_2} \exp\left\{-\frac{jk}{2z_o}\{2\Delta x\xi + 2\Delta y\eta\}\right\} d\xi d\eta$ (Equation 69) --.

Signed and Sealed this

Twenty-fifth Day of October, 2005

JON W. DUDAS
*Director of the United States Patent and Trademark Office*